(12) United States Patent
Kurihara et al.

(10) Patent No.: US 8,566,457 B2
(45) Date of Patent: Oct. 22, 2013

(54) CONTENT DELIVERY SERVICE PROVIDING APPARATUS AND CONTENT DELIVERY SERVICE TERMINAL UNIT

(75) Inventors: Shinichi Kurihara, Yokohama (JP); Koji Nakashima, Mitaka (JP)

(73) Assignees: Kabushiki Kaisha Toshiba, Tokyo (JP); Toshiba Communication Systems Corporation, Tokyo (JP)

( * ) Notice: Subject to any disclaimer, the term of this patent is extended or adjusted under 35 U.S.C. 154(b) by 507 days.

(21) Appl. No.: 11/878,247

(22) Filed: Jul. 23, 2007

(65) Prior Publication Data

US 2007/0271386 A1    Nov. 22, 2007

Related U.S. Application Data

(62) Division of application No. 10/807,313, filed on Mar. 24, 2004, now Pat. No. 7,570,762.

(30) Foreign Application Priority Data

May 23, 2003   (JP) ................................. 2003-146704

(51) Int. Cl.
*G06F 15/16* (2006.01)

(52) U.S. Cl.
USPC .......................................... 709/228; 726/14

(58) Field of Classification Search
USPC .......... 709/228, 203; 726/4, 6, 14, 17, 18, 19; 380/278, 44
See application file for complete search history.

(56) References Cited

U.S. PATENT DOCUMENTS

| | | | |
|---|---|---|---|
| 5,894,516 A | 4/1999 | Brandenburg | |
| 7,120,251 B1 * | 10/2006 | Kawada et al. | 380/201 |
| 7,266,681 B1 * | 9/2007 | Janes | 713/151 |
| 2002/0026512 A1 * | 2/2002 | Nishimura et al. | 709/226 |
| 2002/0035516 A1 * | 3/2002 | Arima | 705/26 |
| 2002/0128904 A1 * | 9/2002 | Carruthers et al. | 705/14 |
| 2002/0194492 A1 * | 12/2002 | Choi et al. | 713/200 |
| 2007/0107027 A1 * | 5/2007 | Carruthers et al. | 725/97 |

FOREIGN PATENT DOCUMENTS

| | | |
|---|---|---|
| CN | 1382292 | 11/2002 |
| EP | 0 561 685 A3 | 9/1993 |
| EP | 1160685 A2 * | 12/2001 |
| JP | 09-134311 | 5/1997 |

(Continued)

OTHER PUBLICATIONS

Notification of the First Office Action in Chinese Patent Application No. 2004100981668 dated Apr. 14, 2006.

(Continued)

*Primary Examiner* — Wing F Chan
*Assistant Examiner* — Kostas Katsikis
(74) *Attorney, Agent, or Firm* — Finnegan, Henderson, Farabow, Garrett & Dunner, L.L.P.

(57) ABSTRACT

On the content delivery side, a user management control unit manages authentication information and the distribution of a delivery list at the time of delivering service, the acceptance of a content select request, and charging and settlement on a user basis. On the other hand, an encrypted content control unit creates a content key and an encrypted content using the content key on the basis of a content key creating condition from a copyright owner or copyright manager. Then, an encrypted content key control unit encrypts the corresponding content key using medium information, or medium information and terminal device unique key information presented at the content request, delivers the key to the requester. Then, a content delivery control unit delivers the corresponding encrypted content to the requester at the content request.

4 Claims, 22 Drawing Sheets

(56) References Cited

FOREIGN PATENT DOCUMENTS

| | | |
|---|---|---|
| JP | 2002-196982 | 7/2000 |
| JP | 2000-339227 | 12/2000 |
| JP | 2000-349725 | 12/2000 |
| JP | 2001-306954 | 11/2001 |
| JP | 2001-344216 | 12/2001 |
| JP | 2004178279 A * | 6/2004 |
| WO | WO 99/53689 | 10/1999 |
| WO | WO 01/31839 A2 | 5/2001 |
| WO | WO 2004070725 A1 * | 8/2004 |

OTHER PUBLICATIONS

British Office Action dated Aug. 16, 2005 (3 pages).
Official Action issued from the Canadian Patent Office in a Counterpart Application No. 2,461,805, dated Dec. 16, 2008.

* cited by examiner

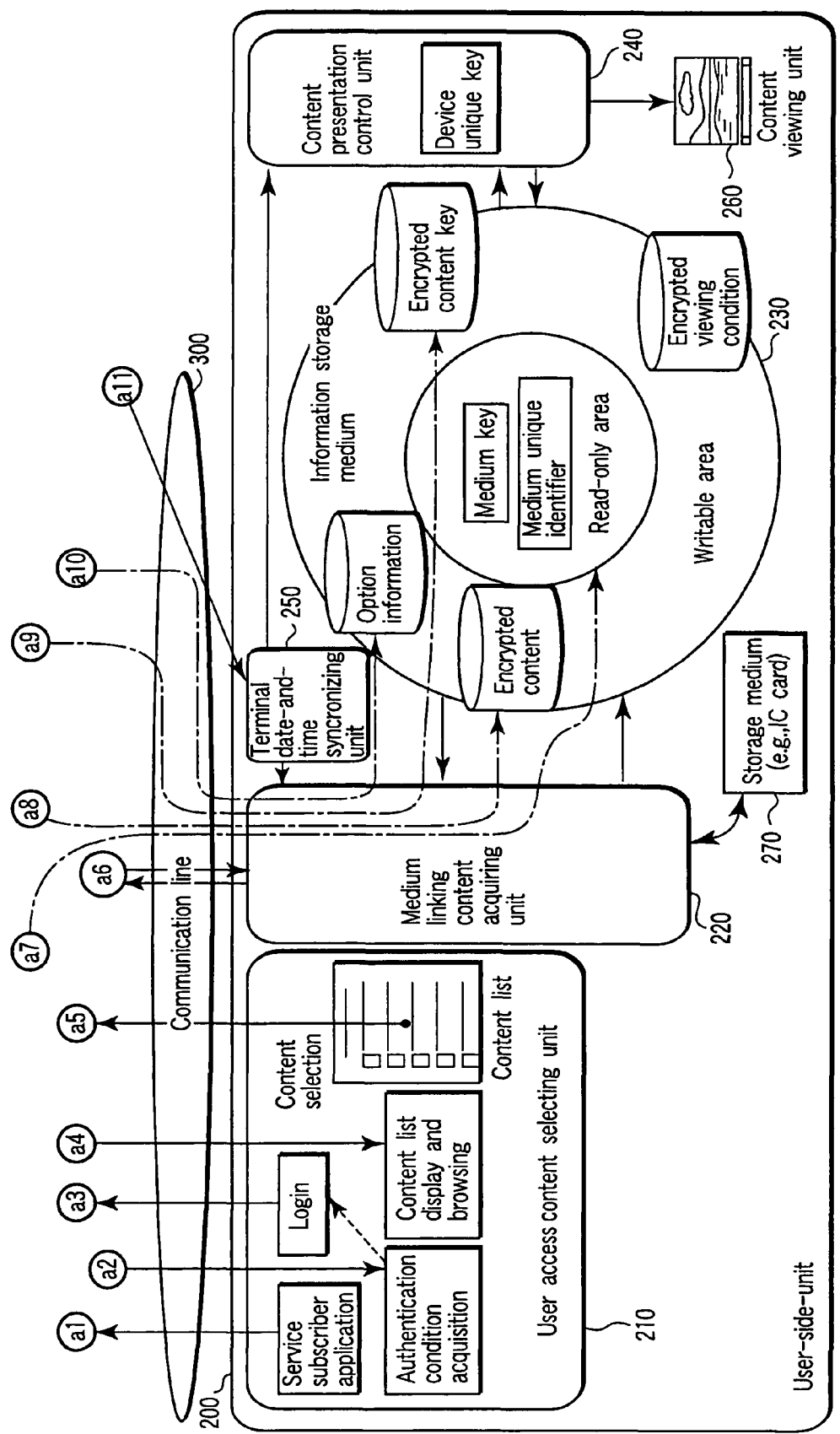
F I G. 1B

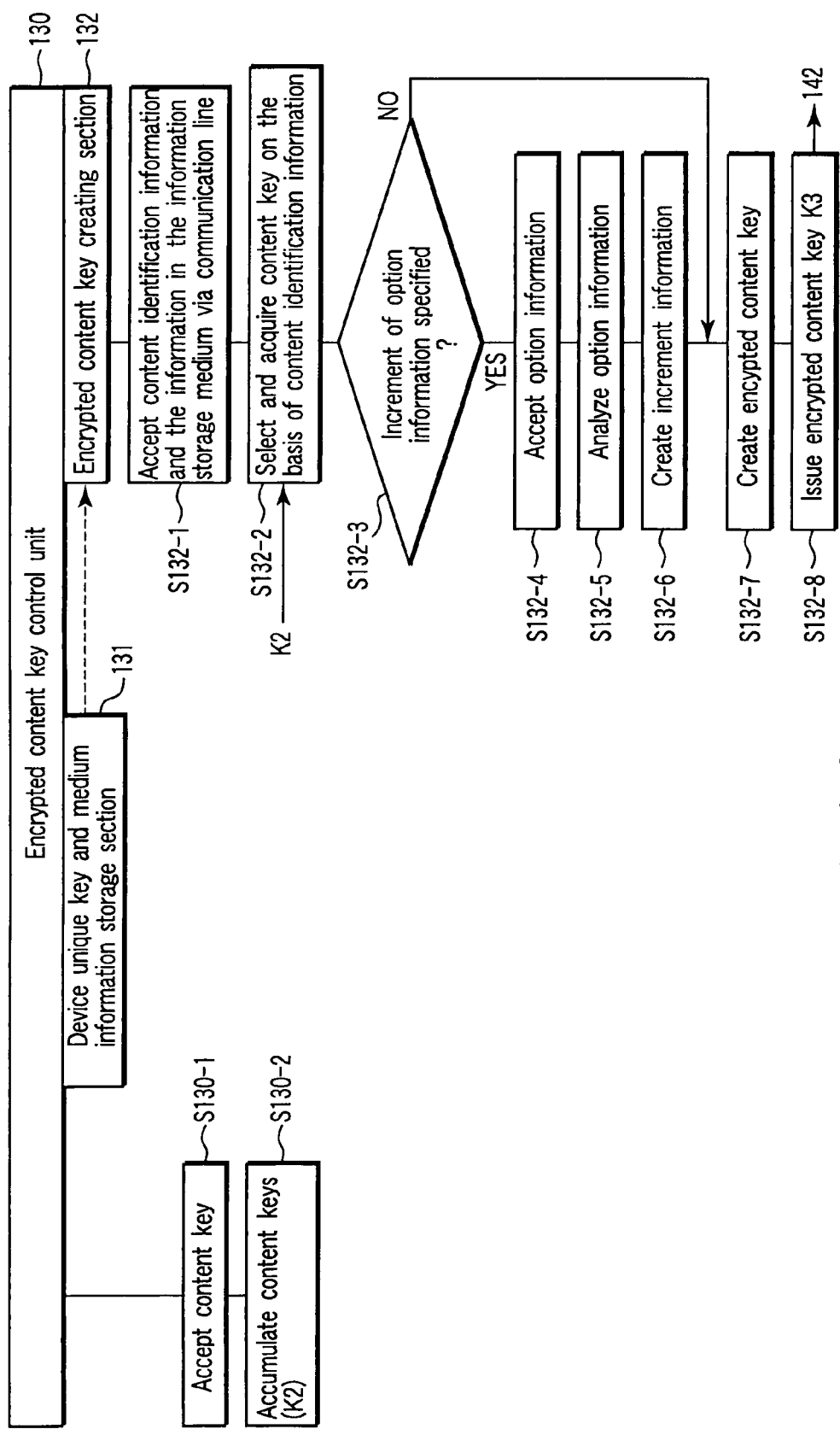
F I G. 6

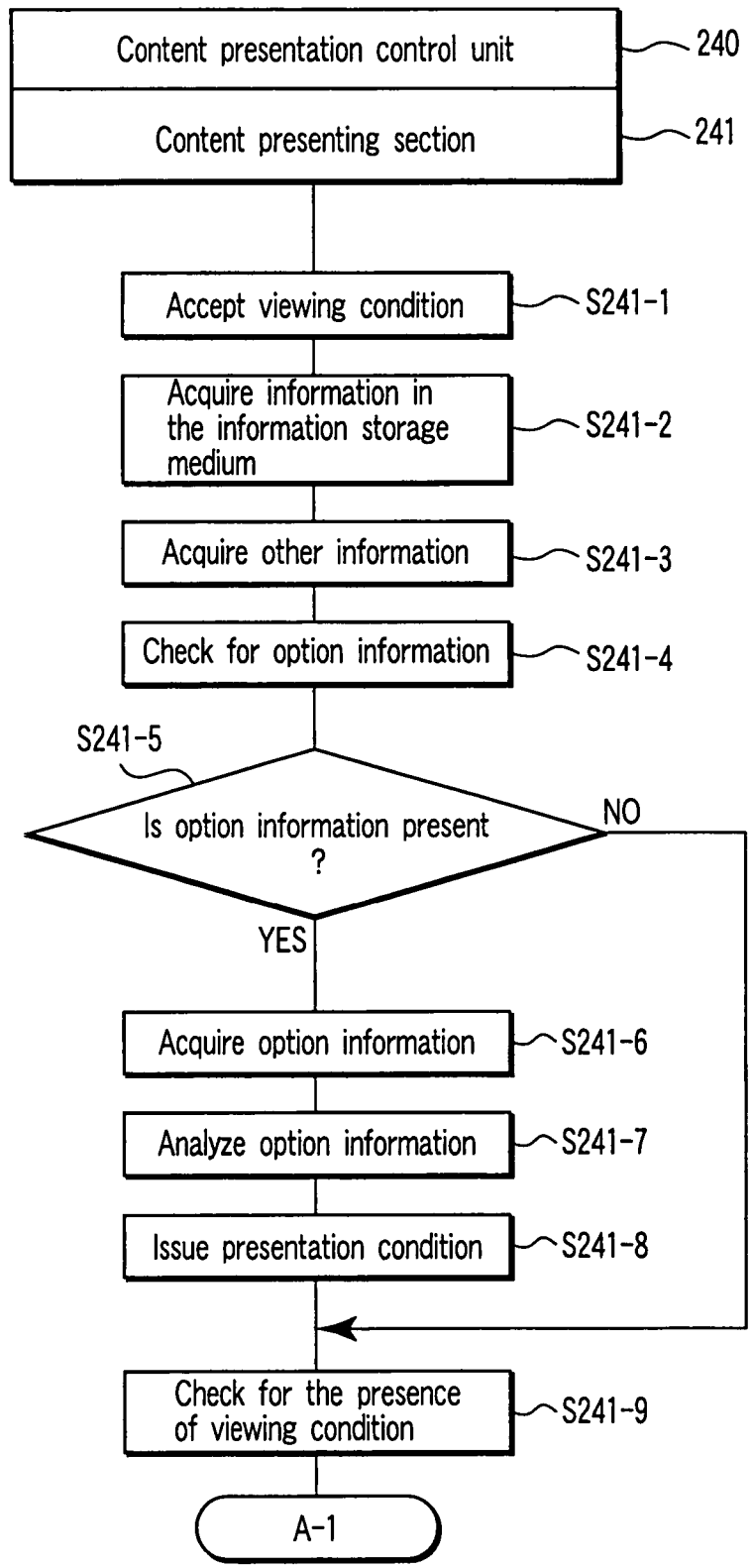
F I G. 11A

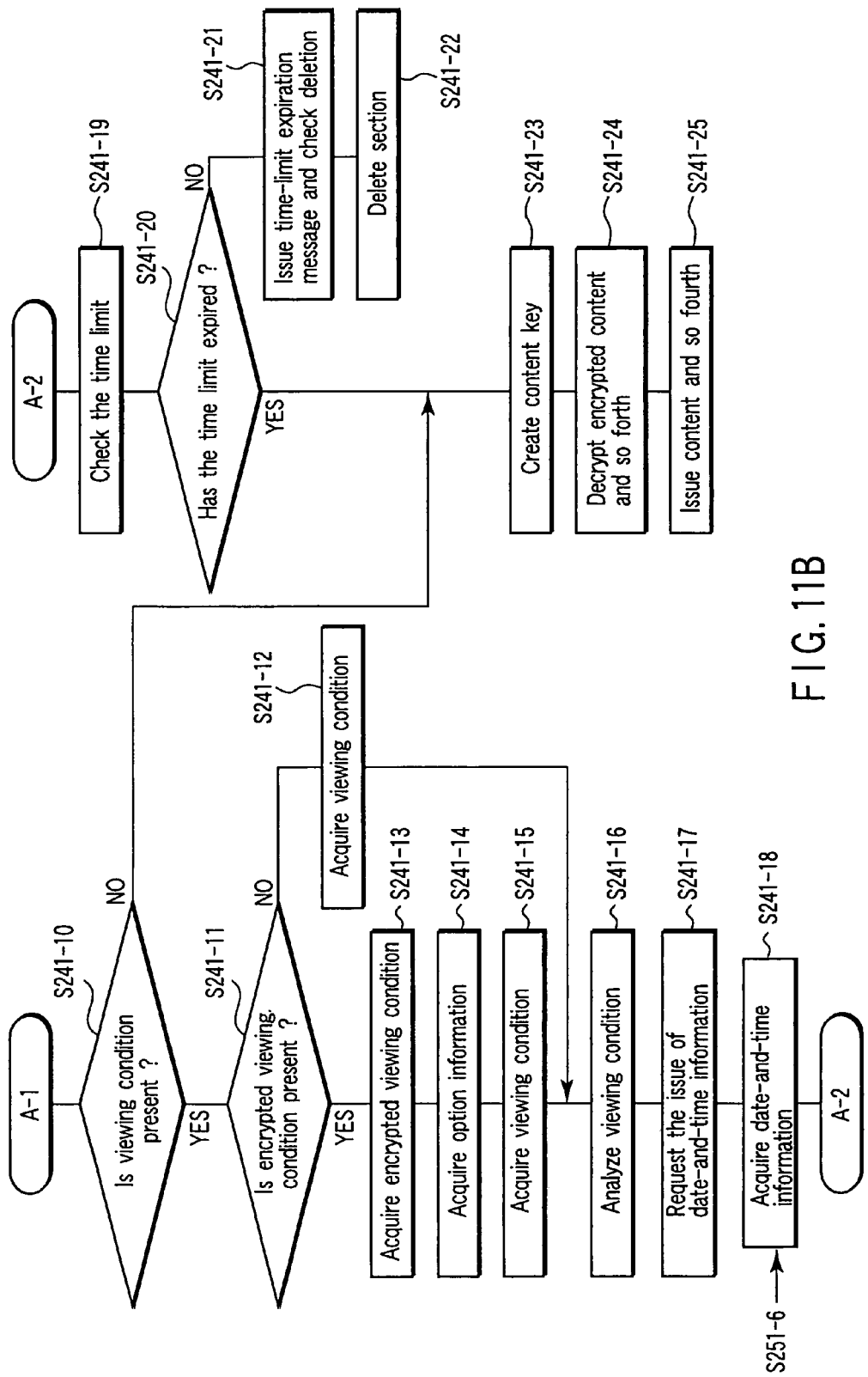
F I G. 11B

CONTENT DELIVERY SERVICE PROVIDING APPARATUS AND CONTENT DELIVERY SERVICE TERMINAL UNIT

CROSS-REFERENCE TO RELATED APPLICATIONS

This application is a divisional of U.S. patent application Ser. No. 10/807,313, filed Mar. 24, 2004 now U.S. Pat. No. 7,570,762, which claims the benefit of priority from prior Japanese Patent Application No. 2003-146704, filed May 23, 2003, the entire contents of which are incorporated herein by reference.

BACKGROUND OF THE INVENTION

1. Field of the Invention

This invention relates to a content delivery service providing apparatus which performs the service of delivering content via a communication line to users' terminal units and to a user terminal unit which receives the service, and more particularly to the technique for protecting the copyright for content.

2. Description of the Related Art

With recent advances in communication techniques as found in the Internet, and in data compression techniques or the like in digital signal processing, a tremendous amount of content data, including music data, movies data, and game data, can be delivered, which enables users to receive content delivery services, regardless of time and place. Generically, a system to realize the content delivery service is such that a person who wants to buy or view (hereinafter, a user) accesses the content delivery center that is delivering the desired content, via the communication terminal unit, such as a personal computer or a set-top box (STB), informs a purchase or view request according the menu screen, and then is allowed to download or reproduce the content.

Presently, however, even if the user accesses the center, he or she can only get the introduction of content or the advertising content in the case of popular or topical content. Since most of the desired audio-visual full contents have to be bought by mail order, the user cannot view the content immediately. The reason is that the copyright owner of the content (or the copyright manager, hereinafter, both of the concepts are sometimes generically called the copyright owner) has not yet trusted the personal computer using a communication line, because of illegal copying. As described above, in spite of users' requests or business attractions, content delivery services are in a very passive situation in terms of the delivery of important content because of the illegal distribution problem.

On the other hand, some apartment house suppliers buy topical content from copyright owners to position themselves from the rest and offer services using a communication line to the customers in their own apartment buildings. In such a content distribution form, however, the following problems arise: a lot of content purchase money is needed and ordinary users cannot join the service.

Prior-art examples of a system related to the present invention include the following patent documents 1 to 5.

Patent document 1 (Jpn. Pat. Appln. KOKAI Publication No. 2001-344216) has disclosed a download system using a record-limit-information-added memory card. In the download system, the record limit information key and the content key are recorded as encrypted record limit information in a readable, writable protective area in the data area of a memory card after two-way authentication is successful, thereby preventing illegal download or making it impossible to rewrite or read easily the record limit information to charge for download, which enables content to be downloaded according to the record limit information.

Patent document 2 (Jpn. Pat. Appln. KOKAI Publication No. 2001-306954) has disclosed a data delivery system which acquires usage information from the unit in use each time delivery data is used and distributes the price for the data delivery to the related entities in the desired proportions on the basis of the usage information.

Patent document 3 (Jpn. Pat. Appln. KOKAI Publication No. 2000-349725) has disclosed a broadcast receiver unit which combines channel reception contract information with channel transmission contract information to form a usable contract information list corresponding to the specified content information, determines conditions for the use of content on the basis of the list, and controls the use of the reception content information on the basis of the conditions.

Patent document 4 (Jpn. Pat. Appln. KOKAI Publication No. 2000-339227) has disclosed a data operation method. In the data operation method, content is encrypted using the content key to create the encrypted content, a part of the content is extracted as sample data, watermark-included sample data in which the secret key obtained by encrypting the content key using the user information has been embedded as invisible information is created, and the combined data obtained by combining the watermark-included sample data with the encrypted content is delivered, thereby preventing not only the infringement of copyright but also the destruction or loss of permission information to decrypt the encrypted content.

Patent document 5 (Jpn. Pat. Appln. KOKAI Publication No. 09-134311) has disclosed a security system which writes the device ID, medium ID, permission information encrypted using the data encryption key, and encrypted data into a medium. When reading the data, the security system decrypts the data decryption key from the medium ID, permission information, and its device ID read from the medium, and decrypts the encrypted data read from the medium using the decrypted data decryption key, thereby enabling only the device with the device ID to make decryption and preventing the encrypted data from being decrypted even if the medium or recovery program is stolen, which maintains the confidentiality of the encrypted data on the medium.

Patent document 6 (Jpn. Pat. Appln. KOKAI Publication No. 2002-196982) has disclosed a system which includes a medium section where copyright-added content data is encrypted in a reproducible manner and recorded, and an information recording medium in which management information to determine whether to record or reproduce the copyright-added content data is recorded and which has a control unit with the function of authenticating each of a recording unit for performing a recording process and a reproducing unit for performing a reproducing process. Only when the authenticating function has authenticated the recording or reproducing unit and the management information has determined that recording/reproducing is possible, the system can record/reproduce the content data, thereby recording the content data, while protecting the data from illegal use.

As described above, in spite of users' requests or business attractions, content delivery services are in a very passive situation in terms of the delivery of important content, because the illegal distribution problem is an impediment to the trust of copyright owners.

BRIEF SUMMARY OF THE INVENTION

It is, accordingly, an object of the present invention to provide a content delivery service proving apparatus which has a copyright protection mechanism to prevent an illegal distribution of content, thereby gaining the trust of content copyright owners or copyright managers, and which is capable of realizing effective content delivery services via a communication line at reasonable price, and a terminal unit capable of receiving the services.

The forgoing object is accomplished by providing a content delivery service providing apparatus which provides content delivery service via a communication line to a user-side terminal unit capable of recording content into an information storage medium into which at least a medium unique identifier and medium information on medium key information have been written, or into a different information storage medium from the information storage medium with the information storage medium being set, the content delivery service providing apparatus comprising: a user management control unit which preregisters user information including personal information about a user applying for subscription to the delivery service, service range, and payment method, and manages the distribution of authentication information and the distribution of a delivery content select list at the time of providing service on a user basis, the acceptance of a content select request, charging, and settlement; an encrypted content control unit which acquires not only content but also a content key creation condition from a copyright owner or copyright manager of the content who provides the delivery service, and creates a content key on the basis of the content key creation condition and encrypted content on the basis of the content key; an encrypted content key control unit which accumulates the content keys created at the encrypted content control unit and, at the same time, registers all of or a part of the medium information in the information storage medium and, using the medium information or the medium information and terminal device unique key information presented at the user's content request, encrypts the content key corresponding to the requested content, and issues the encrypted content key to the terminal unit of the requesting user; and a content delivery control unit which accumulates the encrypted contents created at the encrypted content control unit, selects the corresponding content at the user's content request, and delivers the encrypted content to the terminal unit of the requesting user.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B are conceptual diagrams showing the configuration of an embodiment of a content delivery system according to the present invention;

FIG. 6 is a flowchart to help explain the processes of an encrypted content key control unit of the embodiment;

FIGS. 11A and 11B are flowcharts to help explain the processes of a content presentation control unit of the embodiment;

DETAILED DESCRIPTION OF THE INVENTION

Hereinafter, referring to the accompanying drawings, an embodiment of the present invention will be explained.

Figure 1A:
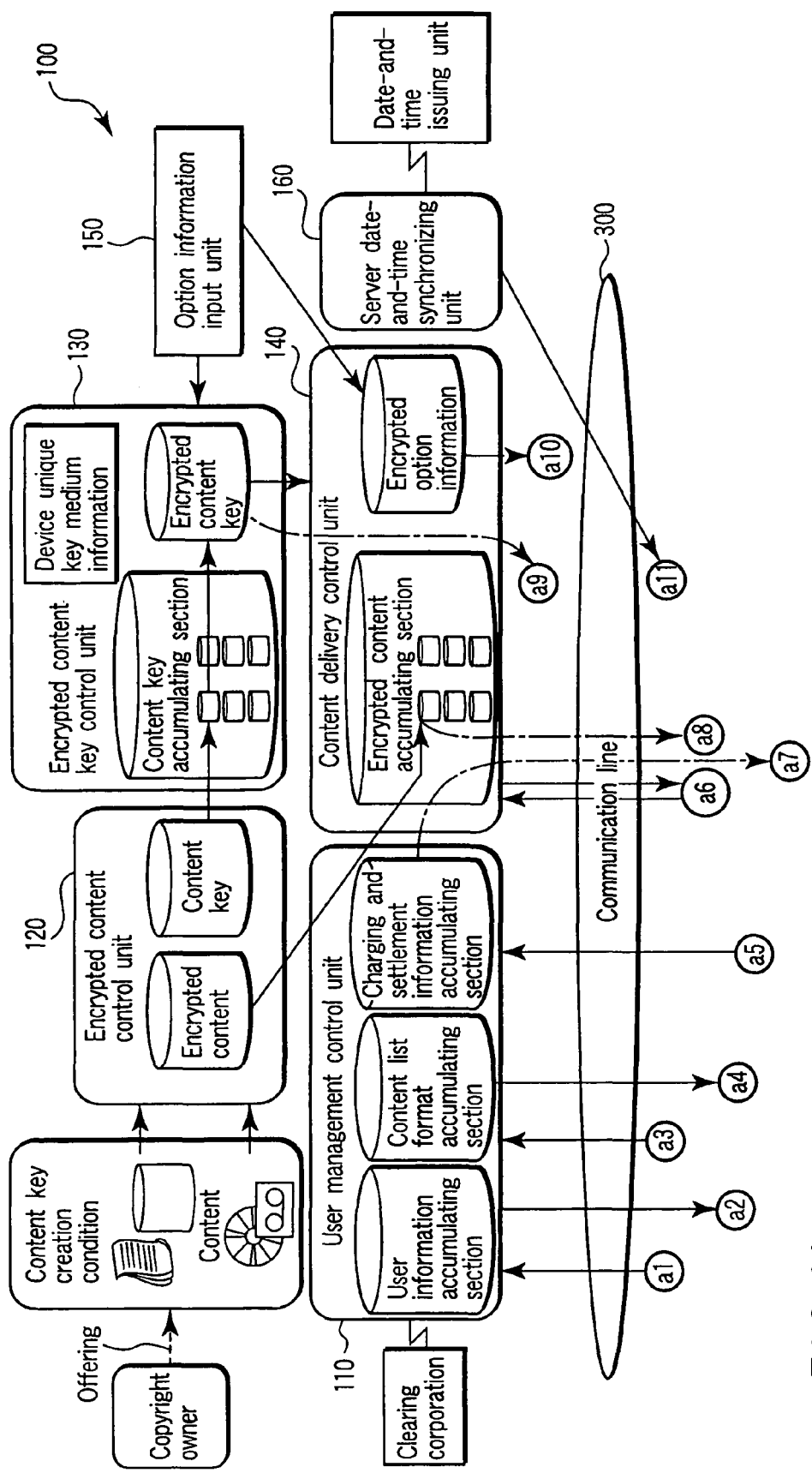

FIGS. 1A and 1B are conceptual diagrams showing the configuration of a content delivery system according to the present invention. The system comprises a content delivery service center unit (hereinafter, referred to as the center-side unit) 100 and a user-side unit 200 which accesses the unit 100 via a communication line 300, thereby receiving content delivery services.

The center-side unit 100 includes a user management control unit 110, an encrypted content creating section 120, an encrypted content key control unit 130, a content delivery control unit 140, an option information input unit 150, and a server date-and-time synchronizing unit 160. The user-side unit 200 includes a user access content selecting unit 210, a medium linking content acquiring unit 220, an information storage medium 230 with medium information (medium key information and medium unique identifier), a content presentation control unit 240, a terminal date-and-time synchronizing unit 250, a content viewing unit 260, an information storage medium 270 without medium information (medium key information and medium unique identifier) (hereinafter, just referred to as a storage medium in distinction from the information storage medium 230).

(Center-Side Unit 100)

When the user selects content using the communication line 300, the user management control unit 110 receives information about various requirements necessary to a service subscriber application and the payment method presented by the user and determines whether the applicant user is a qualified person to receive the service.

The service subscriber application method includes contacting the operator by phone, submitting a document by mail, and performing data communications by means of the user access content selecting unit 210. Information about the requirements necessary for service subscriber application includes, for example, name, birth date, address, sex, telephone number, and the type of services subscribed (such as viewing only movies content, viewing only sports content, or viewing all of the contents). The payment method includes a prepaid card method and a credit card method. Information about the payment method includes, for example, the prepaid card number, credit card number, and card expiration date.

At the time of the determination of the requirements, when the payment method is credit card payment, the necessary information is transmitted to the clearing corporation to check if payment is possible. If payment is possible, a settlement identifier is received from the clearing corporation and registered. At this time, to avoid the risk of credit card information leaks, the credit card number and the expiration date of the credit card are deleted from the registration information.

If it has been determined that the applicant user is an unqualified person who cannot receive the service, the applicant user is informed orally, in writing, or via the user access content selecting unit 210 that he or she cannot subscribe to the service. If it has been determined that the applicant user is a qualified person who can receive the service, he or she is registered as a service permitted user and the information presented by the user is accumulated. Then, the authentication condition (user ID, password, or the like) necessary to log on is issued to the applicant user by word of mouth, in writing, via a storage medium, such as an IC card, or via the user access content selecting unit 210.

When the authentication condition is issued via a storage medium or the user access content selecting unit 210, the identifier (user ID) to identify the user or the identifier (device ID) to identify the unit used on the user side may be encrypted and then issued.

The user management control unit 110 reads the corresponding user information for the user who has logged on according to the authentication condition via the user access content selecting unit 210, determines from the registered service type what services (range) the user can receive, and issues authentication information to the user access content selecting unit 210 of the login user. When a content list display request is made from the user access content selecting unit 210 on the basis of the authentication information, the user management control unit 110 selects the content list and format corresponding to the requesting user, edits the selected content list in a format that enables the user access content selecting unit 210 to display, and issues the result to the user access content selecting unit 210.

Furthermore, the user management control unit 110 accepts the content selection from the user access content selecting unit 210 and confirms whether charging requirements are fulfilled before or after the content delivery, on the basis of the settlement identifier received from the clearing corporation (this confirming process is called credit). If the selected content is impossible to buy, the user management control unit 110 informs the user access content selecting unit 210 of the fact as credit information. If it is possible to buy the selected content, the user management control unit 110 informs the user access content selecting unit 210 of the fact as credit information and asks the user again if he or she really wants to buy. When the user eventually acknowledges the purchase, the user management control unit 110 accumulates not only the information as charging and settlement information but also information about what content was selected and purchased at what time and information about the content viewing condition as user information.

The encrypted content control unit 120 acquires the content and the condition for creating a content key used to encrypt and decrypt the content from the copyright owner or manager of the content, creates a content key on the basis of the condition, encrypts the content on the basis of the content key, and then issues the encrypted content and content key. Here, embedding an electronic watermark into the content enables the content provider to be identified in case of the detection of illegal copying.

The encrypted content key control unit 130 accumulates the content key created at the encrypted content control unit 120 in such a manner that the content key corresponds to the encrypted content. Then, the encrypted content key control unit 130 accepts the content identification information from the content delivery control unit 140 or the like and the medium information in the information storage medium 230 (the medium key information and medium unique identifier written in the read-only area of the information storage medium 230) acquired from the medium linking content acquiring unit 220 via the communication line 300, selects the content key corresponding to the encrypted content on the basis of the content identification information, encrypts the content key on the basis of the previously registered device unique key information and the medium information in the information storage medium 230 to create an encrypted content key, and issues the encrypted content key to such a requester as the content delivery control unit 140. When option information is given, the encrypted content key control unit 130 creates the encrypted content key in such a manner that the key includes the option information, and issues the key to the requester.

The option information includes information to identify the content delivery control unit 140, information to identify the medium linking content acquiring unit 220, information to identify a region, information to identify a user, information to show the content viewing condition, and content control incidental information (e.g., menu information, transition information within the content (e.g., thumbnail and menu link)), external link information (e.g., connection addresses for the Internet), and guidance information (e.g., characters and still pictures). These pieces of option information are received from such a unit as the content delivery control unit 140 or the medium linking content acquiring unit 220, or are acquired directly from the option information input unit 150.

The medium information in the information storage medium 240, identification information about the content delivery control unit 140, identification information about the medium linking content acquiring unit 220, user identification information, content viewing condition information, content control incidental information, and the like may be not only received via the content delivery control unit 140 but also acquired from another unit, such as the medium linking content acquiring unit 220 or acquired directly by the input operation on the input unit.

Taking into account the security of the center or hacking from the outside, it is desirable that the content key should be encrypted at the encrypted content control unit 120 or encrypted content key control unit 130 and then accumulated. In this case, the encrypted content key control unit 130 accumulates the content keys in an encrypted state. When receiving an encrypted content key issuing request from the content delivery control unit 140 or the like, the encrypted content key control unit 130 reads and decrypts the corresponding encrypted content key. Then, the encrypted content key control unit 130 encrypts the content key again on the basis of one of or a combination of the content identification information, medium information in the information recording medium 230, information to identify the content delivery control unit 140, information to identify the medium linking content acquiring unit 220, information to identify a region, information to identify a user, content key individual information, and the like. Then, the encrypted content key control unit 130 issues the encrypted key.

The content key individual information means information included in the content key creation condition received from the copyright owner of the content or information created independently and used for decryption in performing encryption in the process of creating the encrypted content or issuing the content key.

The content delivery control unit 140 accumulates a plurality of encrypted contents created at the encrypted content control unit 120, accepts the content information selected by the user at the user management control unit 110 and the user information (including the content viewing condition), and delivers the encrypted content, encrypted content key, and others in cooperation with the user-side unit 200 and the information storage medium 230 mounted on or connected to the unit 200.

To link up with the user-side unit 200 and the information storage medium 230, the content delivery control unit 140 has to start a linking application in the user-side unit 200. To do this, the content delivery control unit 140 issues authorization information to start the linking application to the user-side unit 200 and performs two-way authentication according to the authorization information. On the condition that the two-way authentication is completed according to the authorization information, the content delivery control unit 140 enables the medium information to be issued via the communication line 300 and the delivery content to be written into the information storage medium 230. This makes it possible to disable the communication function of the user-side unit 200 of the user who gained illegal access in the past, which improves the security.

When the linking application on the user-side unit 200 has been encrypted as measures against information leaks, the authorization information is created on the basis of the authentication information created at the user management control unit 110 at the time of login, the user information accumulated in the user management control unit 110, and the identifiers to identify users or identifiers to identify devices stored in the storage medium 270 mounted on or connected to the user-side unit 200 and the user access content selecting unit 210. The authorization information is encrypted as needed and then is issued.

When delivering the content, the content delivery control unit 140 makes a response request to the interface for realizing a link with the user-side unit 200 or the information recording medium 230 (or may grasp the situation of the communication line, using the response of a ping command or the like) and analyzes the response, thereby grasping the load of the communication line. Repeating this process, the content delivery control unit 140 selects the most appropriate one (because of the lowest load or the like) of the communication lines allowing delivery to the user-side unit 200, calculates an estimated time until the delivery of the content is completed, from the capacity of the selected content, the analyzed communication line load, and the like, and makes the resulting information issuable. In addition, the content delivery control unit 140 makes it possible to issue the designation of reserved delivery, such as by what time the content delivery is required to finish in the end, selects a plurality of candidates, and delivers the contents in the order of time closer to the present time or in the order of specified priority.

Furthermore, the content delivery control unit 140 accepts the content viewing condition (including information representing that the content has a limited viewing period, allowed viewing date-and-time (period) information, information about limits to writing into an information storage medium, content protect information, age limit information, and barrier-free environment information (including sign language type and identification information)) and encrypts the condition as needed and issues the result.

The encrypted content viewing condition or content viewing condition may include content control incidental information (e.g., menu information, transition information within the content (e.g., thumbnail and menu link), external link information (e.g., connection addresses for the Internet), guidance information (e.g., characters and still pictures), and electronic watermark control information (e.g., a display on/off flag)) as needed.

Furthermore, the content delivery control unit 140 relates option information (including information to identify the user-side unit 200, information to identify the medium linking content acquiring unit 220, information to identify a region, information to identify a user, information to show the content viewing condition, and content control incidental information, external link information, and guidance information) to the encrypted content and the encrypted content key. Then, the content delivery control unit 140 encrypts the resulting information as needed and issues the encrypted information as encrypted option information.

The server date-and-time synchronizing unit 160 acquires the accurate date and time from a known date-and-time issuing unit or the like via a communication line and issues the held date and time to the requester as needed.

(User-Side Unit 200)

The user access content selecting unit 210 is an information processing unit including a man-machine interface and a communication interface which carry out a series of procedures for the user to receive copyright-protected content delivery services via a communication line in such a manner that the user accesses the center-side unit 100 via the communication line 300, selects contents, and acknowledges the purchase of the contents. For example, the user access content selecting unit 210 is a unit which enables a link with services via a communication line, such as a personal computer, a set-top box, an audio-visual unit, or a household appliance.

Specifically, the user access content selecting unit 210 performs the following things with the user management control unit 110: the delivery of service subscriber application information, the acquisition of authentication condition, login on the basis of the authentication condition, the acquisition, display, and browsing of the content list, the delivery of information about the selection of the content from the content list, and so forth. When the user looks through the contents of the content list displayed and selects contents, he or she further selects the content viewing condition (e.g., whether the content is of the type that permits viewing only in a specific period or of the type that permits viewing without time limitation) at the same time.

The medium linking content acquiring unit 220 has a linking application between the information storage medium 230 and the center-side content delivery control unit 140. According to an authorization request from any one of the user access content selecting unit 210, content delivery control unit 140, and the user, the medium linking content acquiring unit 220 acquires the encrypted content, the encrypted content key, and others from the content delivery control unit 140.

The acquisition method is as follows. The medium linking content acquiring unit 220 sends the medium information in the information storage medium 230 to the content delivery unit 140 and gets the date-and-time information. At the same time, the medium linking content acquiring unit 220 links up with the content delivery control unit 140 and writes the encrypted content and encrypted content key sent from the content delivery control unit 140 via the communication line 300 into the writable area of the information storage medium 230. Then, a check is made if all of the encrypted contents and encrypted content keys have been written into the writable area of the information storage medium 230 properly. If all of them have been written properly, the medium linking content acquiring unit 220 informs the content delivery control unit 140 of the result together with the date-and-time information. On the basis of the notice, the content delivery control unit 140 issues the user's final charging and settlement information and informs the user management control unit 110 of the information.

With the above method, however, it is conceivable that, when the network is cut off by the user before normal writing is notified, the user may not be charged. Therefore, the content delivery control unit 140 sends the encrypted content and then first carries out the charging process, or carries out the charging process and then sends the encrypted content. Here, the following method is effective: when abnormal writing has been notified (a reissue has been requested), the content delivery control unit 140 carries out a reissuing process; and when normal writing has been notified, the content delivery control unit 140 sends the encrypted content key and, when receiving the notice of normal writing of the key, ends the series of processes.

In executing a linking application which links up with the information storage medium 230 or the content delivery control unit 140, the application may be encrypted as measures against information leaks and authorization information may be needed for startup. In this case, the medium linking content acquiring unit 220 informs the content delivery control unit 140 of the authentication information created at the user management control unit 110 at the time of login, the identifiers to identify the user stored in the storage medium (e.g. IC card) mounted on or connected to the user-side unit 200 and in the user access content selecting unit 210, the identifier to identify the user-side unit 200, and so forth. Then, the medium linking content acquiring unit 220 acquires the authorization information from the content delivery control unit 140. Alternatively, in a stand-alone state where the communication line 300 is not used, the medium linking content acquiring unit 220 creates authorization information independently by using the previously acquired information. After the startup, the medium linking content acquiring unit 220 performs two-way authentication on the basis of the authorization information.

When accepting the encrypted option information from the content delivery control unit 140, the medium linking content acquiring unit 220 decrypts the encrypted option information using the authorization information, thereby acquiring the option information. At this time, the medium linking content acquiring unit 220 analyzes the information to identify the content delivery control unit 140, information to identify the unit 220, information to identify a region, information to identify a user, information to show the content viewing condition, content control incidental information, and so forth. Then, the medium linking content acquiring unit 220 makes a check on the basis of the resulting information. According to the result of the check, the medium linking content acquiring unit 220 performs control, including the limitation of the operation, and updates and stores the storage information in the storage medium (e.g., IC card) 270. Then, the medium linking content acquiring unit 220 writes these pieces of information into the writable area of the information storage medium 230.

In addition, when writing the data into the information storage medium 230, the medium linking content acquiring unit 220 accepts information including the content viewing condition notified by the content delivery control unit 140. If the content viewing condition in the information is of the limited-period content viewing type, that is, of the conditional viewing type permitting contents to be viewed only in a specific period, the medium linking content acquiring unit 220 encrypts information representing the content viewing type and date-and-time information and stores the encrypted information into the storage medium (e.g., IC card) mounted on or connected to the user-side unit 200 or writes the information into the writable area of the information storage medium 230.

The information storage medium 230, which is, for example, a DVD-RAM disk, has the medium key information and medium unique identifier written previously into the read-only area. Each of the medium key information and medium unique identifier can be read and outputted according to the request. Furthermore, the encrypted content, encrypted content key, encrypted viewing condition, option information, and others supplied via the medium linking content acquiring unit 220 can be written into the writable area.

On the basis of the device unique key information held by the user-side unit 200 and the medium information in the read-only area of the information storage medium 230, the content presentation control unit 240 decrypts the encrypted content key written in the writable area, thereby creating a content key. On the basis of the content key, the content presentation control unit 240 decrypts the encrypted content and makes the result presentable. Here, when the option information has been acquired at the medium linking content acquiring unit 220 and stored in the storage medium (e.g., IC card) 270 mounted on or connected to the user-side unit 200 or in the writable area of the information storage medium 230, the content presentation control unit 240 reads the information and carries out the presenting process on the basis of the information.

In addition, when the encrypted viewing condition has been acquired at the medium linking content acquiring unit 220 and stored in the storage medium (e.g., IC card) 270 mounted on or connected to the user-side unit 200 or in the writable area of the information storage medium 230, the content presentation control unit 240 reads the condition and at the same time, acquires the information from the terminal date-and-time synchronizing unit 250, and makes a check if the previously accumulated contents have expired. If the contents have expired, the content presentation control unit 240 informs the user of the fact and carries out a process so as to make it impossible to use the contents.

The terminal date-and-time synchronizing unit 250 acquires the date and time from the server date-and-time synchronizing unit 160 in the user-side unit 200 via the communication line 300, accepts a request from the medium linking content acquiring unit 220 or the like, and issues the date and time. Unlike a timer settable on the user side, the unit 250 has a date-and-time holding system that cannot be externally set. Alternatively, when a timer settable on the user-side unit 200 is used, the date and time in the timer may be externally updated in synchronization with the server side. The terminal date-and-time synchronizing unit 250 is not necessarily included in the user-side unit 200 and may acquire the information directly from the server date-and-time synchronizing unit 160.

The content viewing unit 260, which is such a device as a display or a TV, accepts the content presentation information from the content presentation control unit 240 and enables the user to view the content.

With the content delivery system configured as described above, gaining simple access and selecting contents via a communication line enables the contents to be written onto a specific information storage medium 230 in a copyright-protected manner and to be viewed (reproduced or browsed) according to the user's request. In addition, various forms of charge setting, the collection of charges, various forms of content acquisition, and timely services can be achieved efficiently, which enables the user to avoid the trouble of going to a shop and buying or renting the contents.

Here, the communication line 300 is used between the medium linking content acquiring unit 220 and the content delivery control unit 140. Between the other units, not only the communication line 300 but also another information transmission means, including a directly connected line, a circuit, and a storage medium, may be used.

The medium linking content acquiring unit 220 may be mounted on or connected to the user access content selecting unit 210 or may stand alone.

The information storage medium 230 has a read-only area and a writable area as does a DVD-RAM disk. In the read-only area, the medium key information corresponding to each type of user device and the medium unique identifier each medium has is present. Not only a disk medium but also a tape medium or a semiconductor information medium (e.g., memory or IC card) may be used.

The storage medium 270 is not restricted to an information storage medium having both a read-only area and a writable area, such as a DVD-RAM disk and may be a disk medium, a tape medium, a semiconductor information medium (e.g., memory or IC card), and a medium capable of memorizing information.

In the embodiment, the place in which the encrypted content key and the encrypted content are stored is not restricted to the information storage medium in whose read-only area the medium information is present, and may be on another storage medium. For instance, the encrypted content may be stored in a hard disk and the encrypted content key may be stored in an information storage medium, such as an IC card or a DVD medium. In addition, when the encrypted content and the encrypted content key are both stored in a hard disk and an information storage medium, such as an IC card or a DVD medium, can be read by the user-side unit, such a form as enables both download and viewing may be used.

Furthermore, in the embodiment, when a DVD medium is used as the information storage medium 230, the linking application of the medium linking content acquiring unit 220 may read MKB (Media Key Block: medium key information) in the read-only area of a DVD medium, the hash value (existing in the read-only area of the DVD as MKB identification information like MKB), and the medium identifier (Media ID) and send them to the encrypted content key creating application via the content delivery application.

Instead of the MKB hash value described above, verification data or a part of data in held in the MKB along with the MKB hash value may be used. The verification data is similar to the MKB hash value and is contained in an MKB pack 0 (mkbPack0). The MKB has been read from a DVD in units of packs, and the pack 0 is the data block read first from the DVD.

In contrast, the encrypted content key control unit 130 has the MKBs of all of or a part of the patterns licensed and stores them. On the basis of the MKB identification information (hash value) sent from the user-side unit 200, the encrypted content key control unit 130 may select the relevant MKB and, on the basis of the MKB, the server-side device unique key information, and the medium identifier sent from the user-side unit 200, create an encrypted content key.

When the encrypted content key control unit 130 has the MKBs of all the patterns, it need not receive the MKB from the user side. However, when the encrypted content key control unit 130 does not have the MKBs corresponding to the MKB identification information sent from the user-side unit 200, it returns an error state or the like, which might upset the user side. In addition, there is a possibility that licensing fees will rise.

In contrast, when the encrypted content key control unit 130 has only a plurality of MKB patterns and has no MKB corresponding to the hash value sent from the user-side unit 200, it may receive the MKB from the user's DVD medium. This method may cost relatively low licensing fees, but it is necessary to take into consideration that it is difficult to determine whether the MKB is legitimate.

To select the MKB ID information (hash value and verification data) sent from the user-side unit 200, this data is authenticated in accordance with the MAC value of the MKB or a value calculated from the MAC value.

Furthermore, in the system of the present invention, the service range for the users may be for movable bodies (e.g., PDAs) or for fixed reception units. In addition, contents may be delivered, selectively switching between encoding systems according to the viewing form, and charging may be done according to each system.

Moreover, instead of sending information about the condition to the user-side unit 200, the address (presentation location) of the server to which the condition is presented may be shown as the content viewing condition.

Embodiment

Figure 2A:
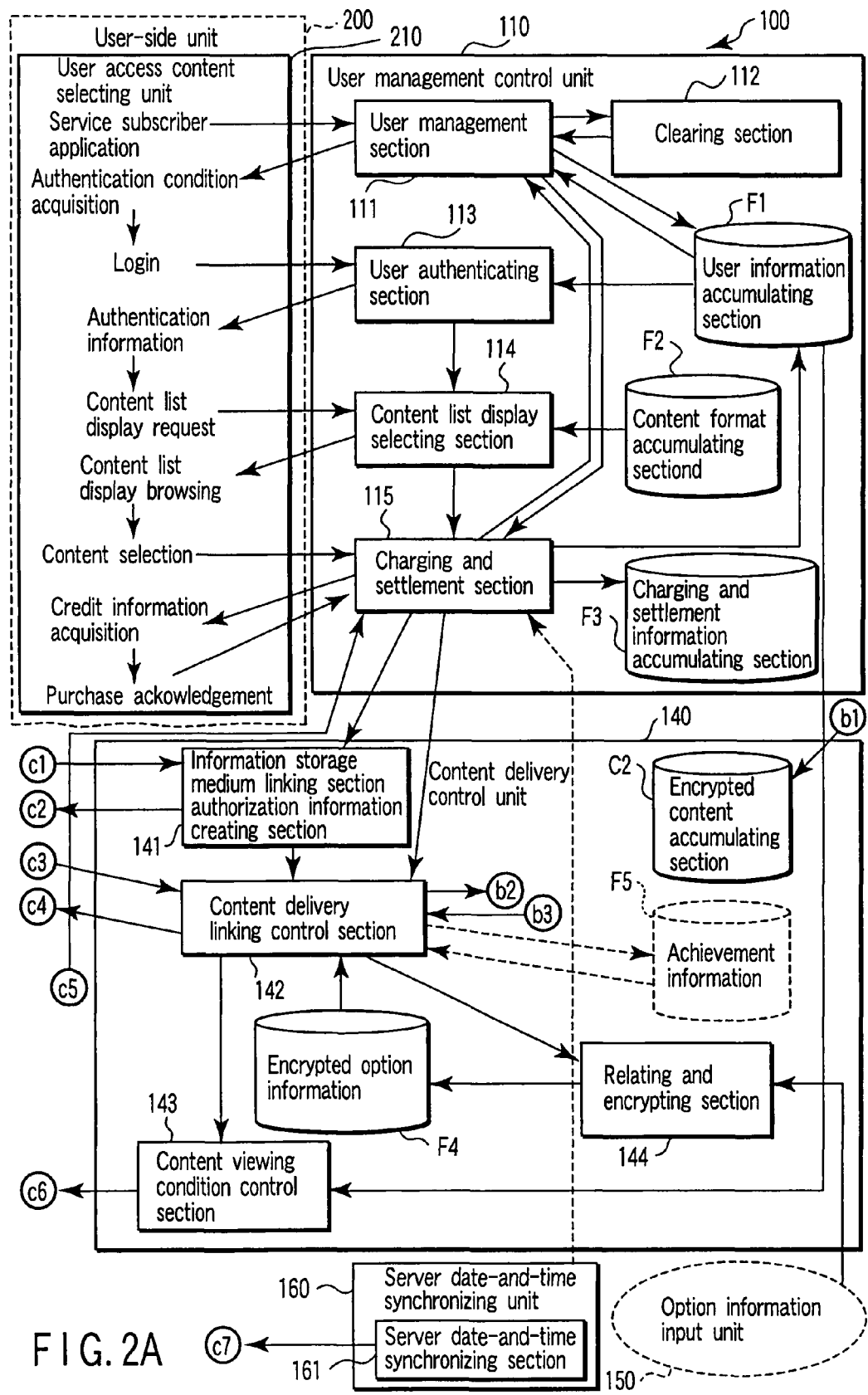
FIGS. 2A, 2B and 2C are block diagrams showing a concrete configuration of the content delivery system of the embodiment.
Figure 2B:
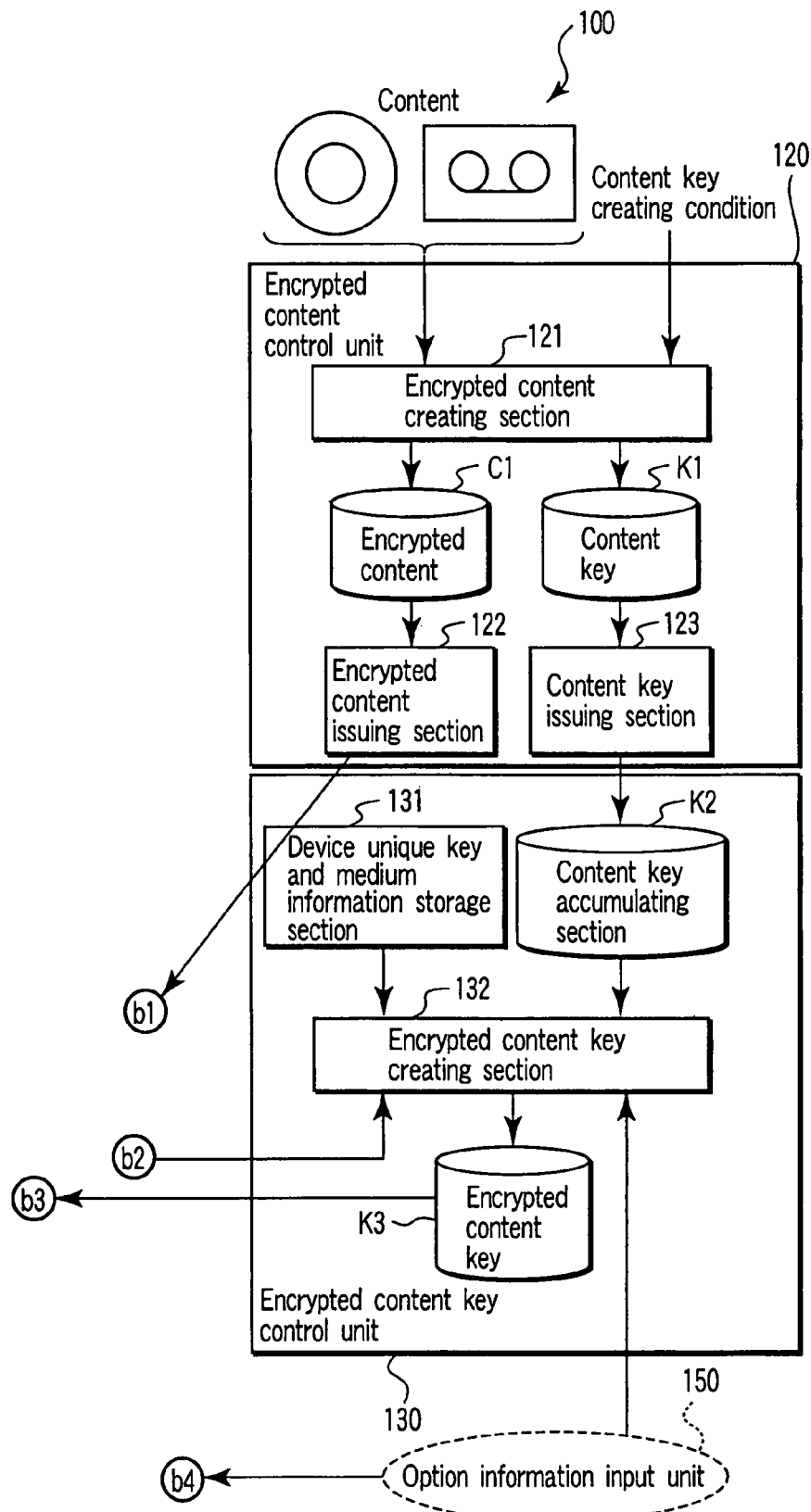
Figure 2C:
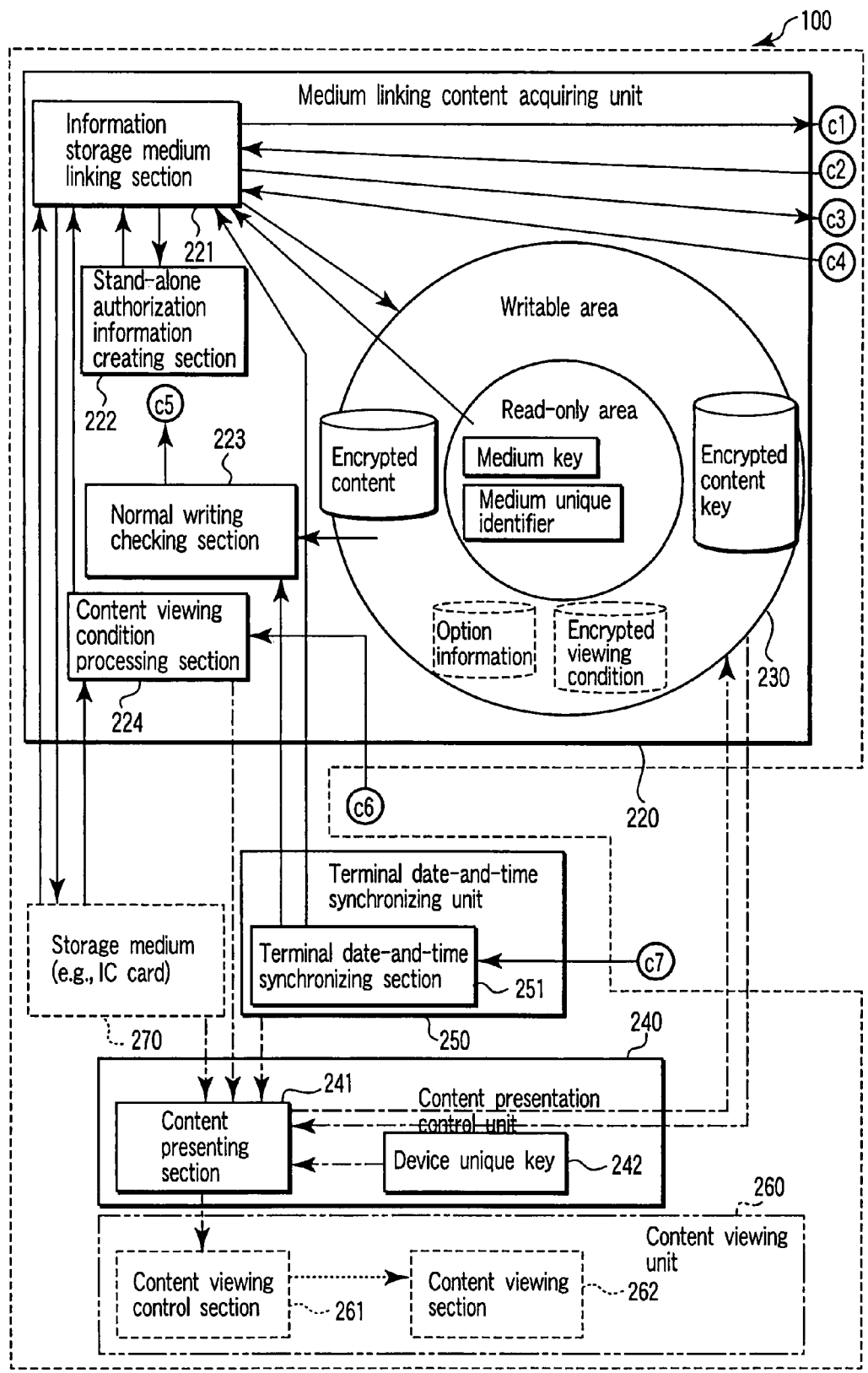

Hereinafter, an embodiment will be explained by reference to FIGS. 2A, 2B and 2C.

(Center-Side Unit 100)

The user management control unit 100 comprises a user management section (including a user information accumulating section F1) 111, a clearing section 112, a user authenticating section 113, a content list display selecting section (including a content list format accumulating section F2) 114, and a charging and settlement section (including a charging and settlement information accumulating section F3) 115. The contents of the processes of the individual blocks 111 to 115 are shown in FIGS. 3A and 3B, FIGS. 4A and 4B.

The user management section 111 takes in various requirements presented by the user in applying for subscription (e.g., name, birth date, address, sex, telephone number, the type of services subscribed (such as viewing only movies content, viewing only sports content, or viewing all of the contents), and the payment method (e.g., credit card number and credit card expiration date)) and determines whether the user is eligible for service delivery.

Figure 3A:
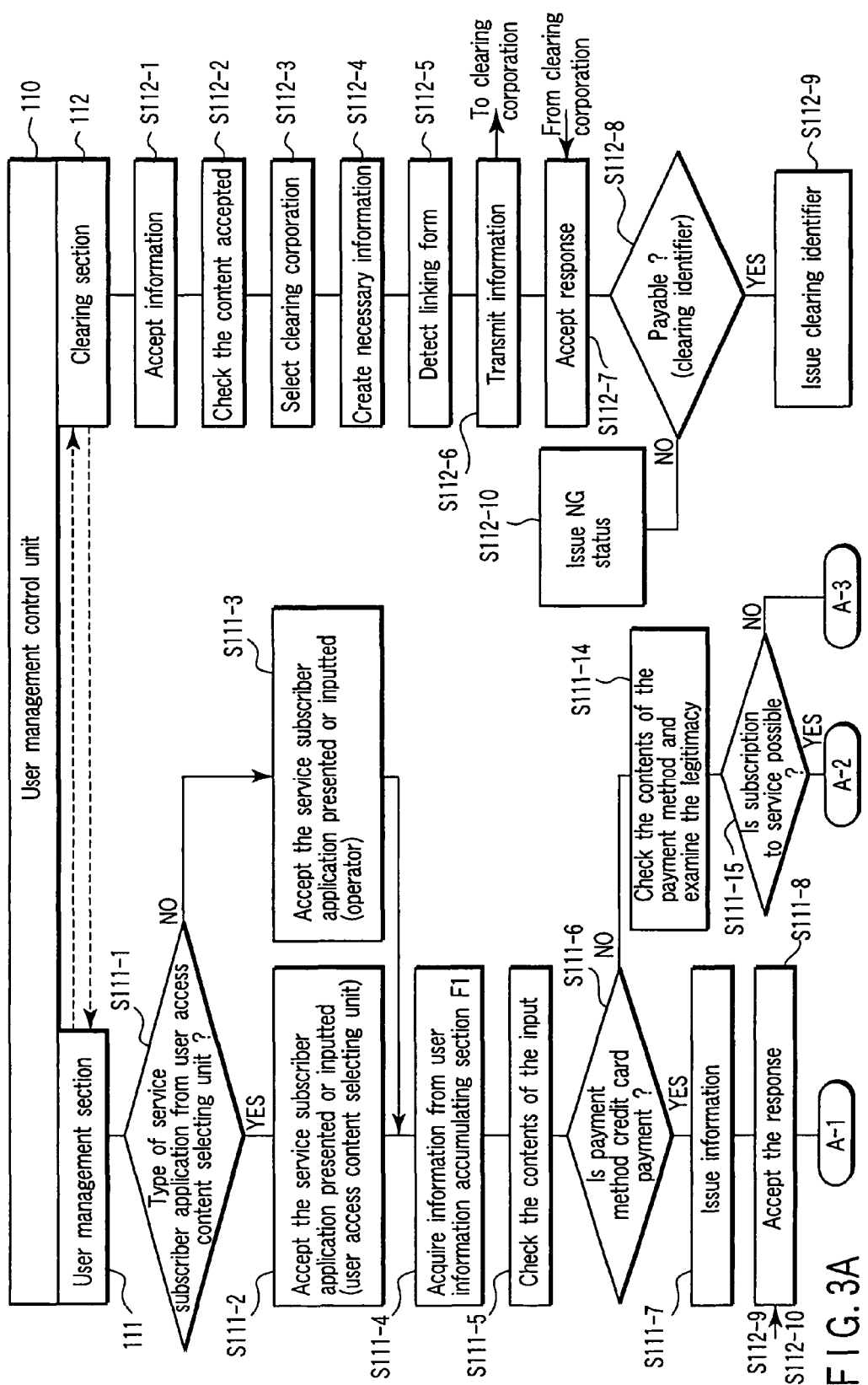
FIGS. 3A and 3B are flowcharts to help explain the processes of a user management control unit of the embodiment.
Figure 3B:
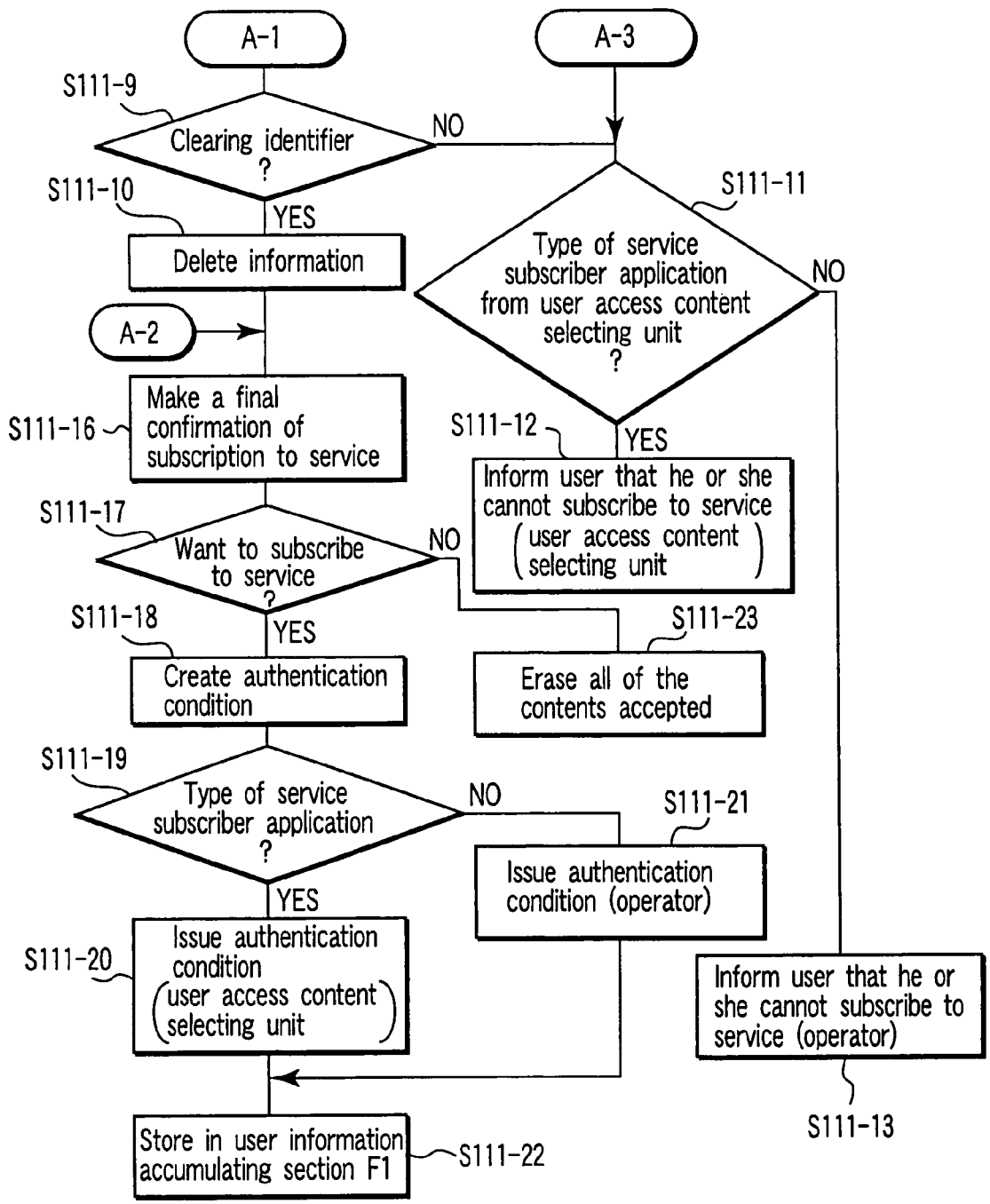

Specifically, as shown in FIGS. 3A and 3B, the user management section 111 determines the type of service subscriber application (S111-1). In the case of notice from the user access content selecting unit 210, the user management section 111 carries out the process of accepting the input of service subscriber application information shown by the notice (S111-2). In the case of notice by phone or the submission of a document by mail, the operator carries out the process of accepting the input of service subscriber application information presented by the user (S111-3). At this time, the user management section 111 refers to the user information accumulating section F1, acquires information about the applying user's past history (S111-4), and checks the contents of the inputted subscriber application information (S111-5).

Next, the user management section 110 determines whether the payment method is credit card payment (S111-6). If it is credit card payment, the user management section 110 issues to the clearing section 112 the following information: the user's name, birth date, address, sex, telephone number, credit card number, card expiration date, and so forth (S111-7).

Receiving these pieces of information (S112-1), the clearing section 112 checks the contents accepted (S112-2), selects the best clearing corporation (S112-3), creates information necessary for the clearing corporation (S112-4), detects the predetermined information linking form (S112-5), and transmits information to the clearing corporation in that form (S112-6). Then, accepting the response from the clearing corporation (S112-7), the clearing section 112 confirms whether the applying user can pay (S112-8). If the applicant can pay, the clearing section 112 receives the clearing identifier issued from the clearing corporation and issues it to the user management section 111 (S112-9). If the applicant cannot pay, the clearing section 112 receives an NG status from the clearing corporation and issues it to the user management section 111 (S112-10).

The user management section 111 accepts the clearing identifier or NG status from the clearing section 112 (S111-8). Then, the user management section 111 determines whether the accepted response is the clearing identifier indicating that the applicant can pay (S111-9). If the response is the clearing identifier, the user management section 111 erases such information as credit card number and credit card expiration date to avoid the risk of credit card information leaks (S111-10). If the response is the NG status indicating that the applicant cannot pay, the user management section 111 determines the type of service subscriber application (S111-11) and informs the user via the user access content selecting unit 210 that the user cannot subscribe to the service (S111-12). Alternatively, the user management section 111 informs the terminal or the like used by the operator of the fact (S111-13). Then, the operator or the like phones the user the fact or informs the user of the fact by mail.

On the other hand, if it is determined in step S111-6 that the payment method is not credit card payment, the user management section 111 checks the contents of the payment method and examines the legitimacy of the user (S111-14). In the examination, it is determined whether the applying user can subscribe to the service (S111-15). If it is determined that the applicant can subscribe to the service, the user management section 111 informs the user of a final confirmation whether the user wants to receive the service (S111-16) and determines whether there is a request for service subscription (S111-17).

Receiving the acknowledgement of service subscription, the user management section 111 creates authentication conditions (including user ID and password) necessary to log in (S111-18), determines the type of service subscriber application (S111-19), issues the authentication condition to the user via the user access content selecting unit 210 (S111-20) or issues the condition to the user via the operator or the like (S111-21), and stores in the user information accumulating section F1 the following information: various requirements, clearing identifiers, and authentication conditions (S111-22). On the other hand, if the acknowledgement of service subscription is not received in step S111-17, the user management section 111 erases all of the contents of the information accepted on application (S111-23).

The user management section 111 informs the user of the issued authentication condition by word of mouth or by letter or informs the user of the condition via a storage medium (e.g., IC card) or the user access content selecting unit 210. In informing the user of the authentication condition via a storage medium or the user access content selecting unit 210, it is desirable that the identifier to identify the user or the identifier to identify the device should be issued in encrypted form, taking information leaks into account.

Figure 4A:
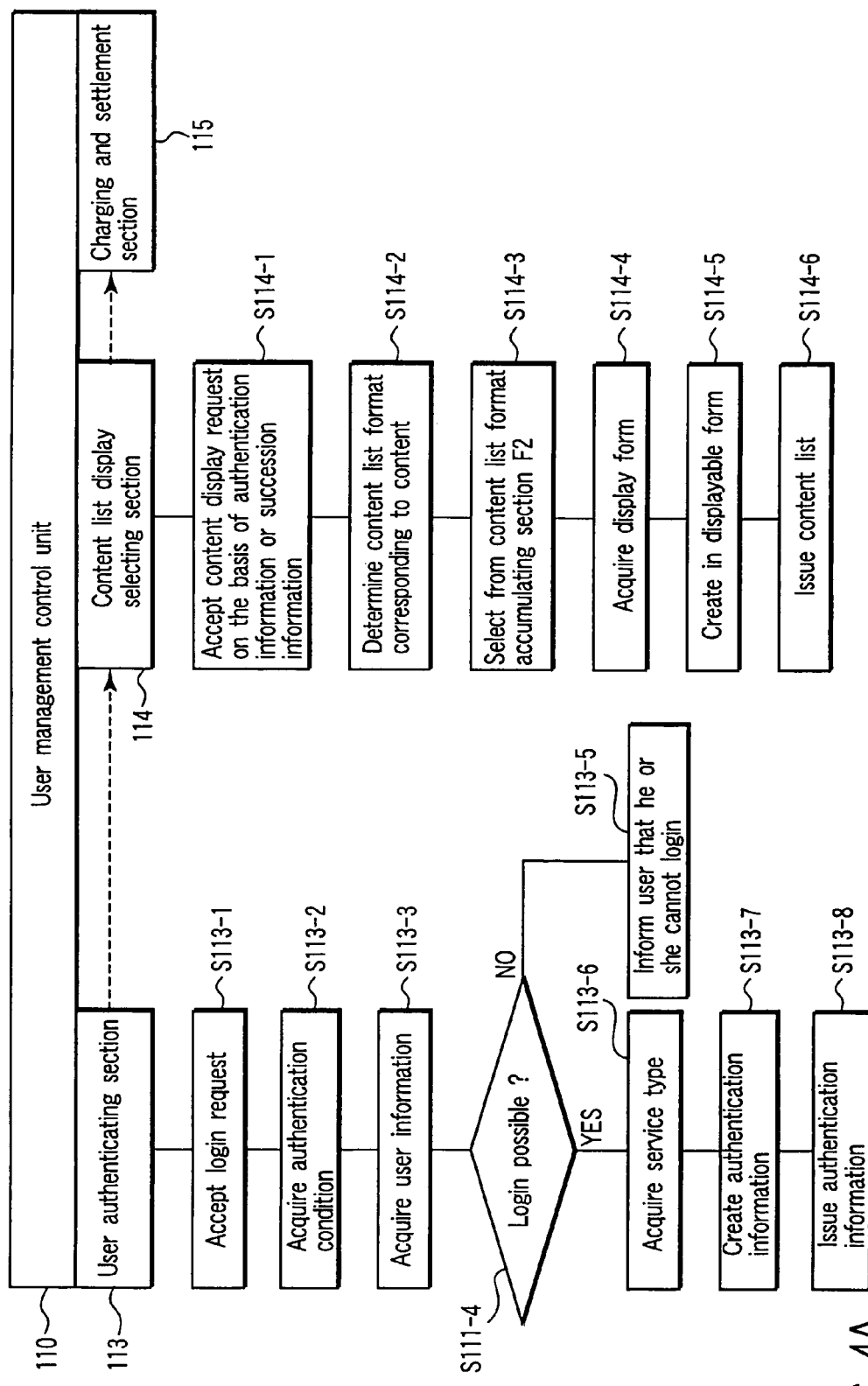
FIGS. 4A and 4B are flowcharts to help explain the processes of the user management control unit of the embodiment.
Figure 4B:
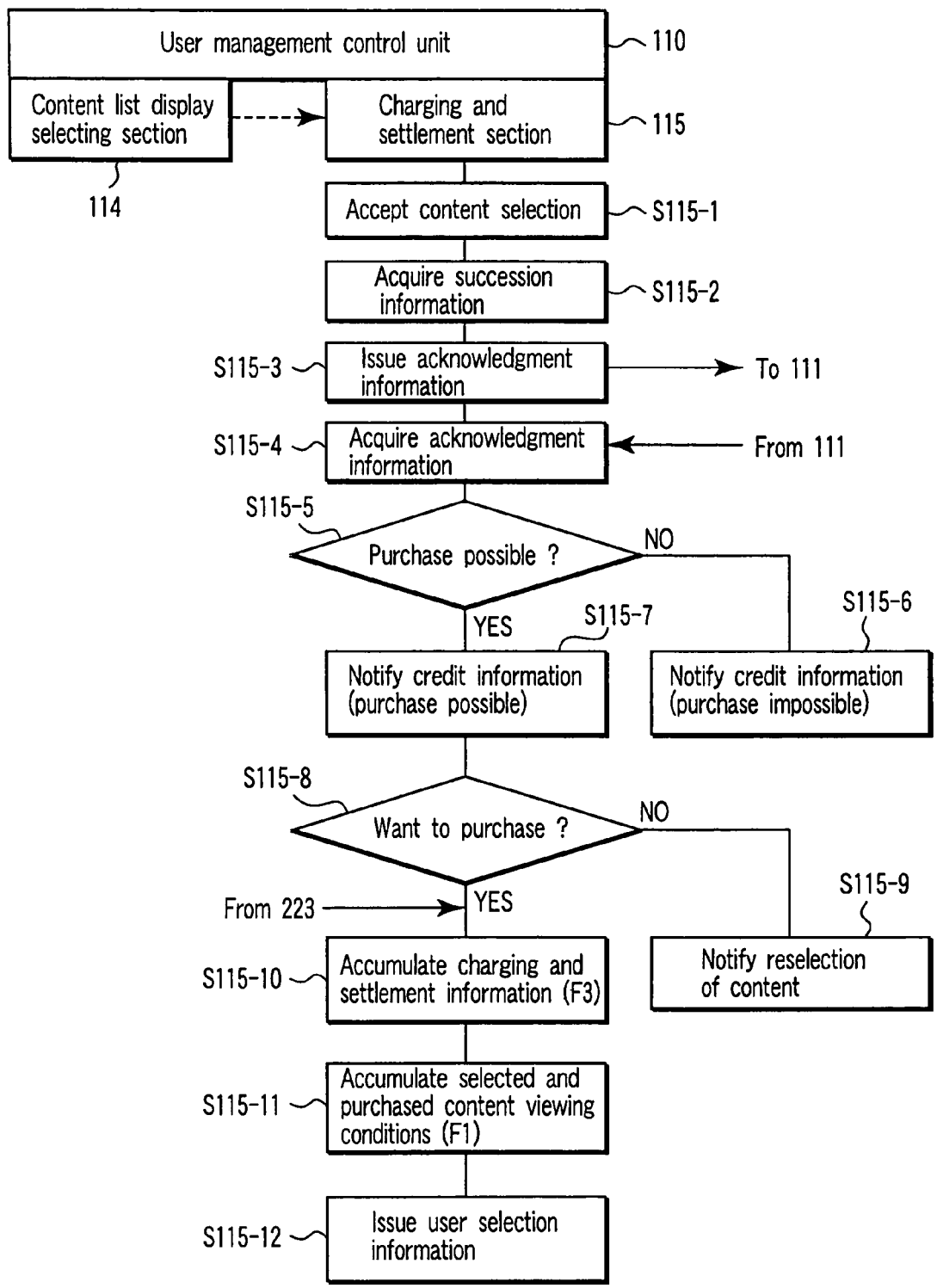

When the user gets the authentication condition issued at the user management section 310 and, on the basis of the authentication condition, uses the user access content selecting unit 210, and logs in via the communication line 300, the user authenticating section 113, the content list display selecting section 114, and the charging and settlement section 115 carry out the processes shown in FIGS. 4A and 4B.

First, the user authenticating section 113 accepts a login request (S113-1), gets the authentication information (S113-2), then gets the information accumulated in the user information accumulating section F1 (S113-3), and determines whether login is possible (S113-4). If login is impossible, the user authenticating section 113 reports this (S330-5). If login is possible, the authenticating section 113 gets information as to what type of service (range) the user can receive from the service types accumulated in the user information accumulating section F1 (S113-6), creates authentication information on the basis of the acquired information (S113-7), and issues the authentication information to the user access content selecting unit 210 used by the user (S113-8).

On the basis of the authentication information issued by the user authenticating section 113 to the user access content selecting unit 210 or succession information (including user information) from the user authenticating section 113 logged into by the user, the content list display selecting section 114 accepts a content list display request from the user (S114-1), determines a content list format corresponding to the requesting user (S114-2), selects it from the content list format accumulating section F2 (S114-3), converts the selected format into a form or the like the user access content selecting unit 210 can display (S114-5), and issues the form to the user access content selecting unit 210 (S114-6).

At this time, the user displays and looks through the content list issued at the contest list display selecting section 114 on the user access content selecting unit 210 and, on the basis of the display, selects the content the user wants to get. At this time, the user also selects the content viewing condition (e.g., whether the content is of the type that permits viewing only in a specific period or of the type that permits viewing without time limitation) according to the content list display.

The charging and settlement section 115 accepts the content selection from the user access content selecting unit 210 (S115-1) and at the same time, acquires the succession information from the content list display selecting section 210 (S115-2), and issues acknowledge information about whether the requirement for charging can be fulfilled to the user management section 111 (S115-3). Receiving this, the user management section 111 acquires the necessary information from the user information accumulating section F1, makes a determination in cooperation with the clearing section 112, and informs the charging and settlement section 115 of the result of the determination as acknowledge information.

Receiving the acknowledge information from the user management section 111 (S115-4), the charging and settlement section 115 determines from the result of the determination of the acknowledge information whether the selected content can be purchased (S115-5). If the selected content cannot be purchased, the charging and settlement section 115 informs the user access content selecting unit 210 of the fact as credit information (S350-6). If the selected content can be purchased, the charging and settlement section 115 informs the user access content selecting unit 210 of the fact as credit information (S350-7) and asks the user again whether he or she really wants to buy (S115-8).

If the result of the acknowledgment has shown that the user does not buy in the end, the charging and settlement section 115 informs the user access content selecting unit 210 that the content is to be selected again (S115-9). If the purchase has been acknowledged, the charging and settlement section 115 accumulates this information as charging and settlement information in the charging and settlement information accumulating section F3 (S115-10) and at the same time, accumulates when and what content the user selected and purchased and information about the content viewing condition in the user information accumulating section F1 (S115-11), and issues the content information selected by the user and the user information (including the content viewing condition) (S115-12).

Figure 5:
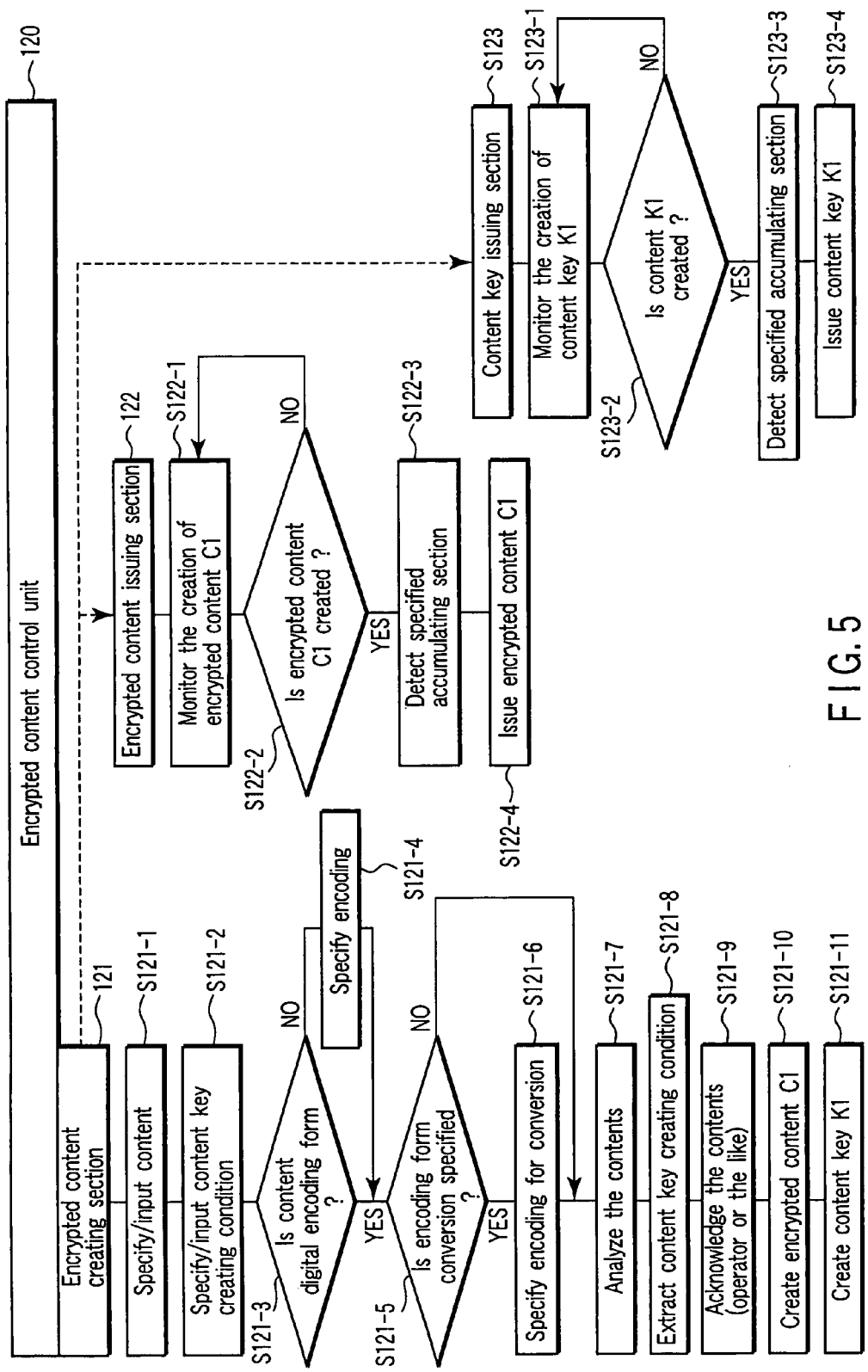
FIG. 5 is a flowchart to help explain the processes of an encrypted content control unit of the embodiment.

The encrypted content control unit 120 is composed of an encrypted content creating section 121, an encrypted content issuing section 122, and a content key issuing section 123. FIG. 5 shows the contents of the processes of the blocks 121 to 123.

The encrypted content creating section 121 specifies or inputs the content provided by the copyright owner of the content and the content key creating condition for decrypting the encrypted content (S121-1, S121-2). If the content is not in a digitally encoded form (such as AVI, MPEG-1, MPEG-2, or MPEG-4), the encrypted content creating section 131 further specifies encoding (S121-3, S121-4). Even if the content is in a digitally encoded form (such as AVI, MPEG-1, MPEG-2, or MPEG-4), the encrypted content creating section 131 specifies the conversion of the encoding form, thereby making it possible to specify the content encoding form in decryption (S121-5, S121-6). The content key creating condition may be inputted directly by hand. Alternatively, electronic data in which the content key creating condition and the like are written as the copyright information in the form of text file, MPEG-7, or the like may be specified and inputted.

The encrypted content creating section 121 analyzes the contents of the inputted content key creating condition (S121-7), extracts the content key creating condition (S121-8), checks the operator and the like (S121-9), and creates not only encrypted content C1 on the basis of the specified condition (S121-10) but also the content key K1 (S121-11).

The encrypted content issuing section 122 observes whether encrypted content C1 has been created (S122-1, S122-2). If encrypted content C1 has been created, the encrypted content issuing section 122 detects the encrypted content accumulating section (C2 of the content delivery control unit 140 in FIG. 2A) previously specified or specified each time encryption is performed (S122-3), and issues encrypted content C1 to the accumulating section (S122-4).

The content key issuing section 123 observes whether content key K1 has been created (S123-1, S123-2). If content key C1 has been created, the encrypted content key issuing section 123 detects the content key accumulating section (K2 of the encrypted content key control unit 130 in FIG. 2B) previously specified or specified each time a content key is created (S123-3), and issues the content key to the accumulating section (S123-4).

The encrypted content key control unit 130 includes a device unique key and medium information storage section 131, an encrypted content key creating section 132, a content key accumulating section K2, and an encrypted content key accumulating section K3. The encrypted content key control unit 130 executes the processes shown in FIG. 6.

In FIG. 6, the encrypted content key control unit 130 accepts the content key issued at the content key issuing section 123 from the encrypted content control unit 120 each time encrypted content is created (S130-1), and accumulates a plurality of content keys in the content key accumulating section K2 (S130-2). The encrypted content key creating section 132 accepts not only the content identification information but also the medium information (medium key information and medium unique identifier) in the information storage medium 230 from an information storage medium linking section 221 of the medium liking content acquiring unit 220 via the communication lien 300 and a content delivery linking control section 142 (S132-1), selects the content key corresponding to the encrypted content from the content key accumulating section K2 on the basis of the content identification information (S132-2), creates encrypted content key K3 from the content key on the basis of the device unique key information stored in the device unique key and medium information storage section 131 and the medium information in the information storage medium 230 (132-7), and issues encrypted content key K3 to the content delivery linking control section 142 (S132-8). All of the key information may be stored in the device unique key and medium information storage section 131. Alternatively, the device unique key, together with the medium information, may be sent from the user-side unit 200 to the device unique key and medium information storage section 131 each time content is requested.

In addition, the encrypted content key creating section 132 determines whether an increment of encrypted content keys is specified as option information (S132-3). If the increment is specified, when creating an encrypted content key, the encrypted content key creating section 132 accepts option information (including information to identify the content delivery unit 140, information to identify the medium linking content acquiring unit 220, information to identify a region, information to identify a user, information to show the content viewing condition, content control incidental information (e.g., menu information, transition information within the content (e.g., thumbnail and menu link), external link information (e.g., connection addresses for the Internet), and guidance information (e.g., characters and still pictures)) (S132-4), analyzes the option information (S132-5), and creates increment information (S132-6). The encrypted content key creating section 132 creates an encrypted content key in a manner that includes a part of these pieces of information as conditions (S132-7), and issues the key to the content delivery linking control section 142 (S132-8).

In addition to receiving the medium information in the information storage medium 230, information to identify the content delivery unit 140, information to identify the medium linking content acquiring unit 220, information to identify a user, information to show the content viewing condition, content control incidental information, and so forth via the content delivery linking control section 142, the encrypted content key creating section 132 may get them directly from another unit, such as the medium linking content acquiring unit 220, or from direct input means. In this case, too, the encrypted content key creating section 132 creates an encrypted content key and issues the key to the requester.

The content delivery control unit 140 is composed of an information storage medium liking section authorization information creating section 141, a content delivery linking control section 142, a content viewing condition control section 143, a relating and encrypting section 144, an encrypted content accumulating section C2, an encrypted option information accumulating section F4, and an achievement information accumulating section F5. The content delivery control unit 140 executes the processes shown in FIGS. 7A, 7B and 7C.

Figure 7A:
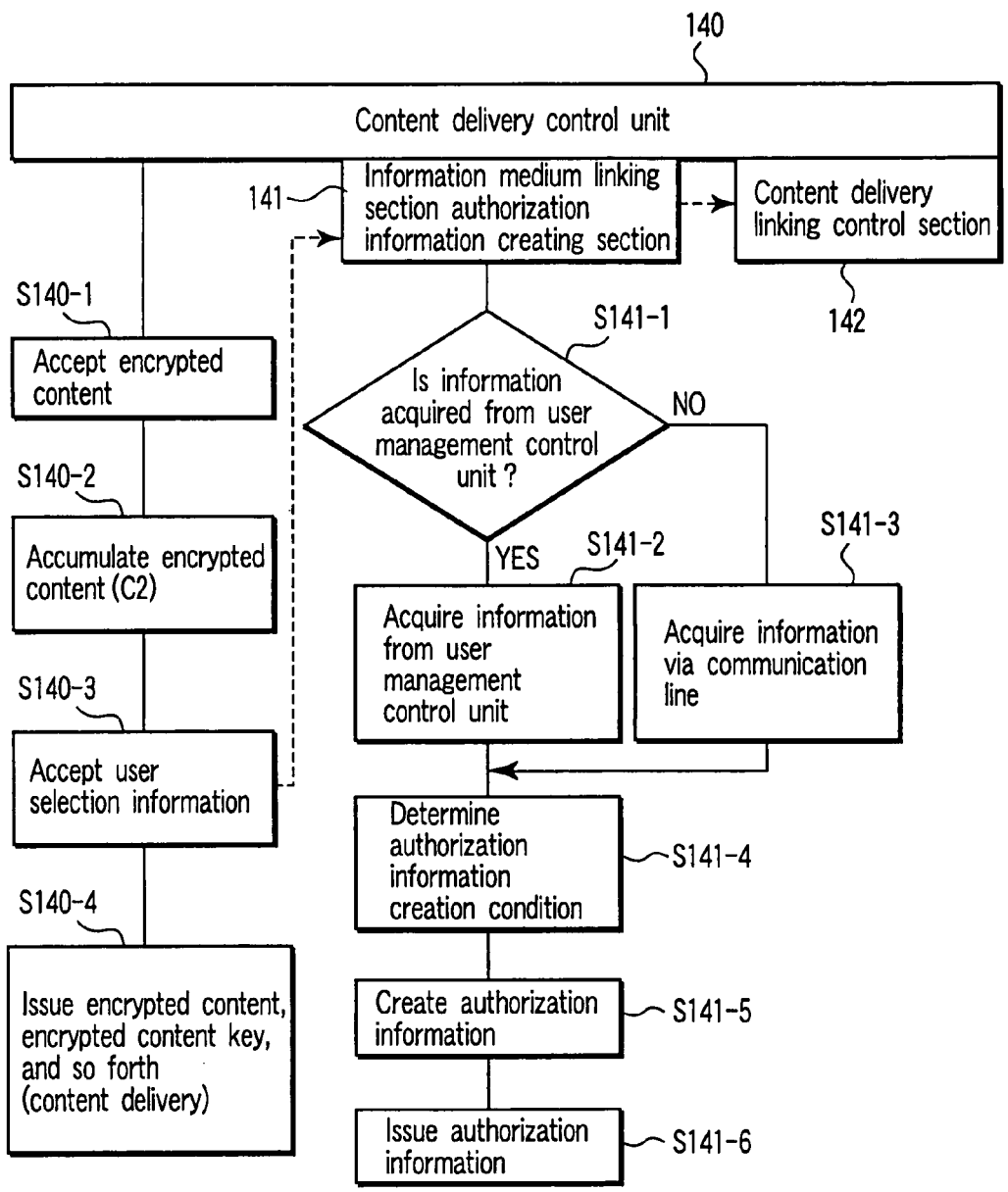
FIGS. 7A, 7B and 7C are flowcharts to help explain the processes of a content delivery control unit of the embodiment.
Figure 7B:
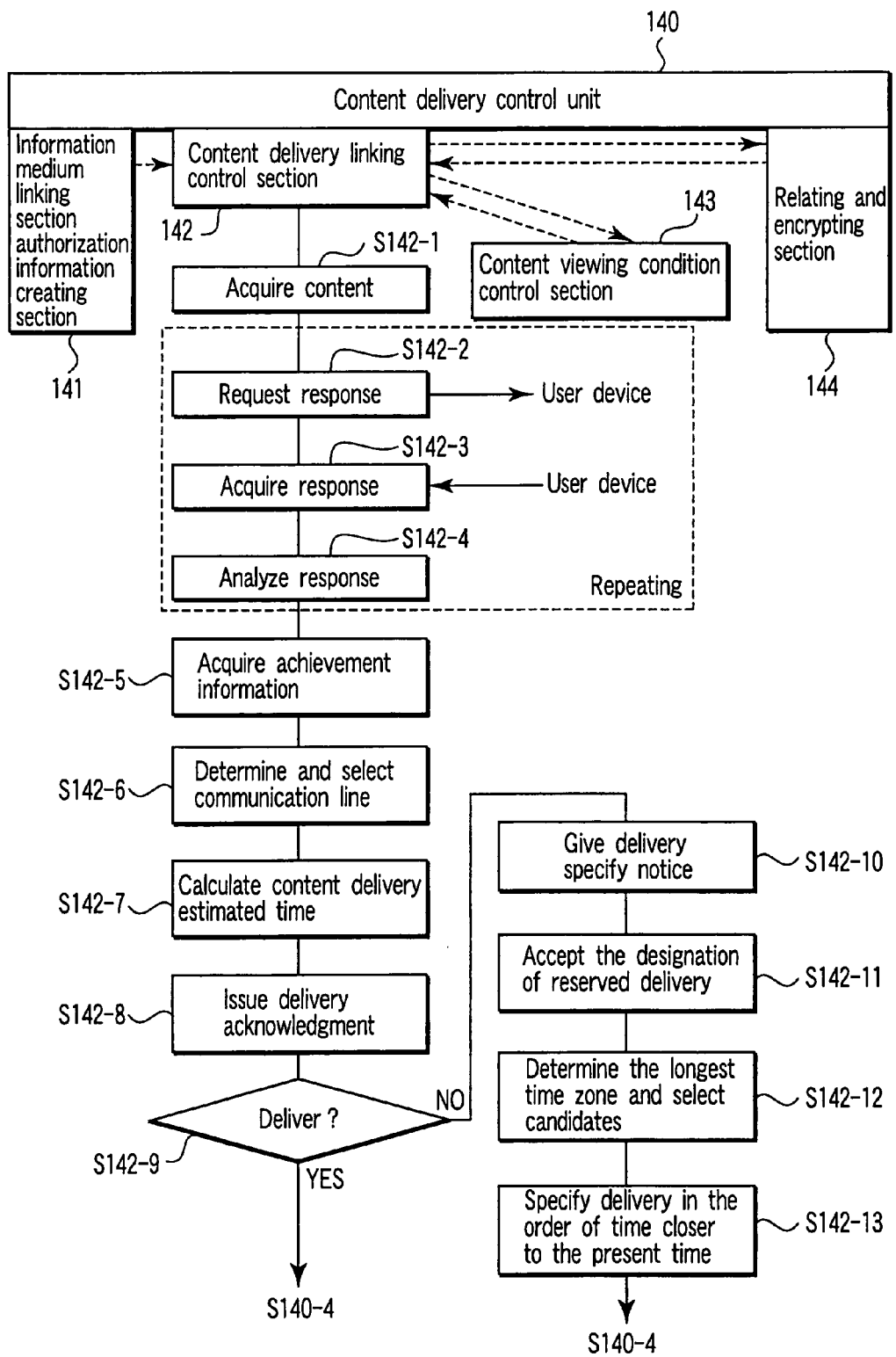
Figure 7C:
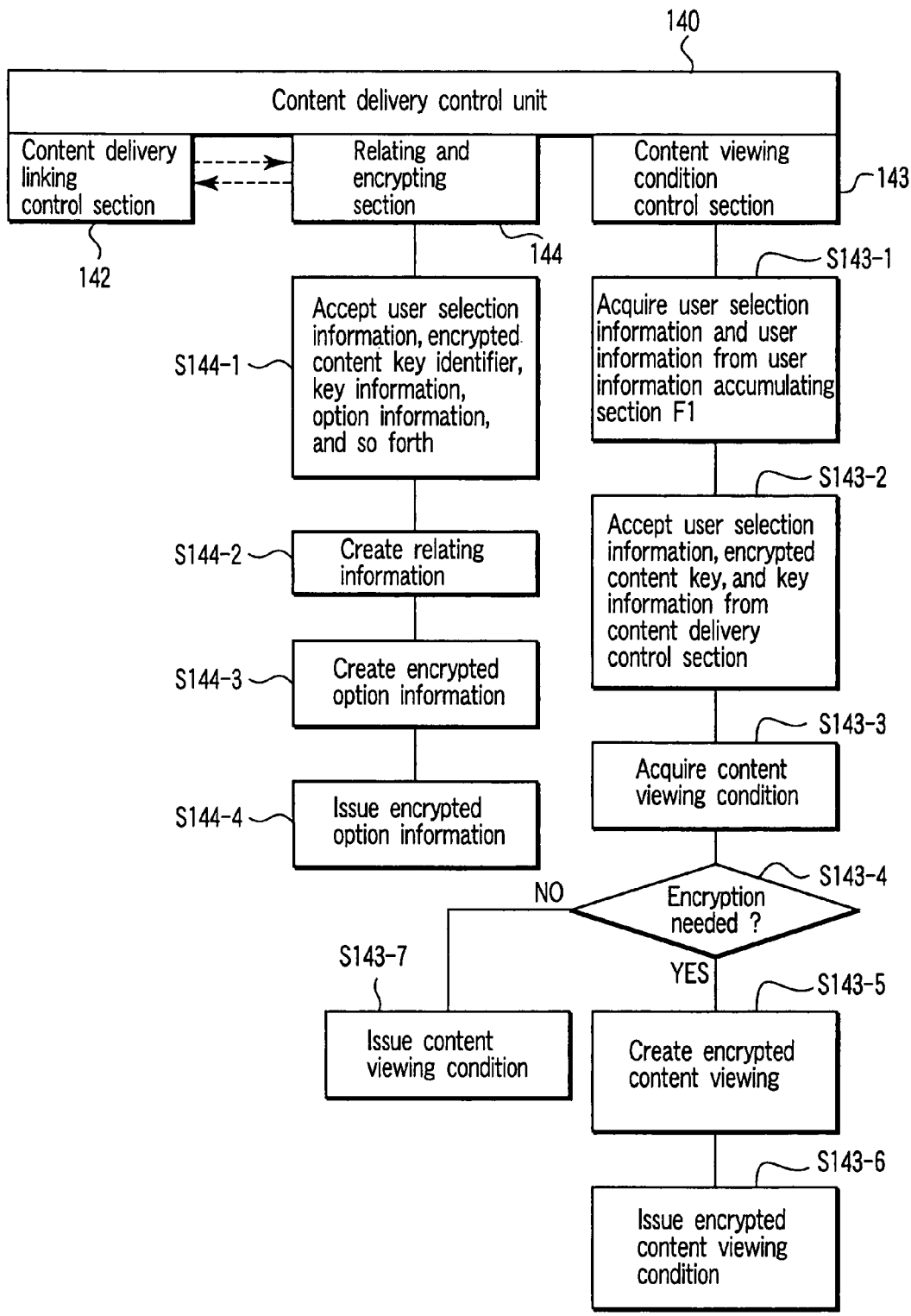

In FIGS. 7A, 7B and 7C, the content delivery control unit 140 accepts the encrypted content encrypted at the encrypted content control unit 120 and issued at the encrypted content issuing section 122, accumulates a plurality of encrypted contents in the encrypted content accumulating section C2 (S140-1, S140-2), accepts the user's selected content information issued at the charging and settlement section 115 and the user information (including the content viewing condition) (S140-3), and delivers the encrypted content, the encrypted content key, and so forth in cooperation with the user-side unit 200 and the information storage medium 230 (S140-4).

When cooperating with the user-side unit 200 and the information storage medium 230, the content delivery control unit 140 needs authorization information for startup in a case where the linking application installed in the user-side unit 200 has been encrypted as measures against information leaks. Thus, on the basis of the authentication information created at the user management control unit 110 at the time of login, the user information accumulated in the user management control unit 110 (S141-1, S141-2), the storage medium (such as an IC card) 270 mounted on or connected to the user-side unit 200, the identifier to identify the user stored in the user access content selecting unit 210 or the identifier to identify the device (S141-1, S141-3), and the like, the information storage medium liking section authorization information creating section 141 creates authorization information (S141-5) and issues the information (S141-6).

Acquiring the encrypted content, the encrypted content key, and so forth (S142-1), the content delivery linking control section 142 delivers the encrypted content, the encrypted content key, and others in cooperation with the user-side unit 200 and the information storage medium 230. For delivery, the content delivery linking control section 142 makes a response request to the user-side unit 200 (or may grasp the situation of the communication line, using the response of a ping command or the like) (S142-2), gets the response from the user-side unit 200 (S142-3), and analyzes the response time and arrival path information (142-4), thereby grasping the load of the communication line.

The content delivery linking control section 142 repeats the processes in step S142 to S142-4 to get the past achievement information from the achievement information storage section F5 (S142-5), determines a communication line whose response time is short, which has no path to be adversely affected, and which is simplified in terms of path, from the communication lines capable of delivering to the user-side unit 200, and selects it as the most appropriate communication line (S142-6). Furthermore, the content delivery linking control section 142 calculates an estimated time until the delivery of content is completed, from the capacity of the selected content, the analyzed communication line load, and so forth (S142-7), issues the information to the user (S142-8), and confirms whether to deliver (S142-9).

The content delivery linking control section 142 accepts the acknowledgement of delivery from the user and starts to deliver the content. If receiving the acknowledgment of no delivery, the content delivery linking control section 142 gives delivery specify notice (S142-10) to make it possible to specify a reserved delivery regarding, for example, by what time the user wants to end the content delivery (S142-11), selects a plurality of candidates (S142-12), specifies delivery in the order of time closer to the present time (S142-13), and starts to deliver the content.

The content viewing condition control section 143 acquires the content information selected by the user and the user information from the user information accumulating section F1 (S143-1) or accepts the content information selected by the user, the encrypted content key identifier, and the key information from the content delivery linking control section 142 (S143-2), and acquires the content viewing condition (including information representing that the content has a limited viewing period, allowed viewing date-and-time (period) information, information about limits to writing into an information storage medium, content protect information, age limit information, barrier-free environment information (including sign language type and identification information)) (S143-3). At this time, the content viewing condition control section 143 determines whether there is a piece of information requiring encryption in the accepted or acquired information (S143-4). If there is such a piece of information, the content viewing condition control section 143 performs encryption on the basis of the key information (S143-5) and issues the result as an encrypted content viewing condition (S530-6). If encryption is unnecessary, the content viewing condition control section 143 issues the result as a content viewing condition (S143-7).

The relating and encrypting section 144 accepts the content information selected by the user, the encrypted content key identifier, and the key information from the content delivery linking control section 142. The relating and encrypting section 144 further accepts the option information, including information to identify the content delivery control unit 140, information to identify the medium linking content acquiring unit 220 of the user-side unit 200, information to identify a region, information to identify a user, information to show the content viewing condition, content control incidental information, and guidance information (S144-1), relates the option information to the encrypted content and the encrypted content key to create relating information (S144-2), and encrypts the option information on the basis of the key information (S144-3), and issues the result as encrypted option information F4 (S144-4).

The option information input unit 150 issues the option information to the encrypted content key creating section 132 and the relating and encrypting section 144 in response to the input operation by the operator or the like.

Figure 8:
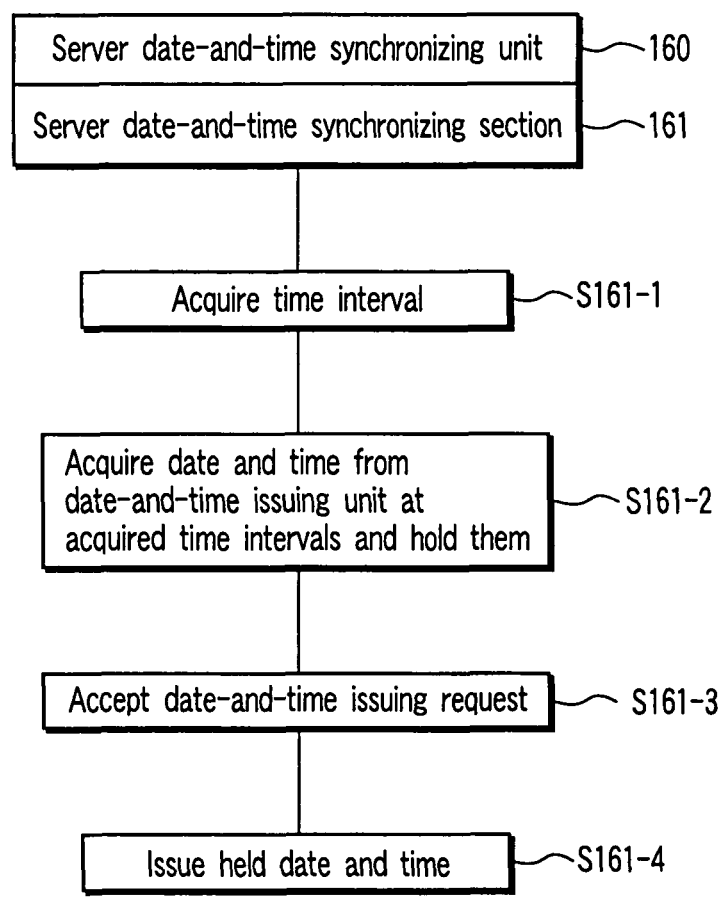
FIG. 8 is a flowchart to help explain the processes of a server data-and-time synchronizing unit of the embodiment.

The server date-and-time synchronizing unit 160 includes a server date-and-time synchronizing section 161. As shown in FIG. 8, the server date-and-time synchronizing section 161 gets the accurate date and time from a known date-and-time issuing unit or the like available to the public on WWW at time intervals set by the manager (S161-1, S161-2), accepts a date-and-time issuing request (S161-3), and issues the stored date and time to the requester according to the request (S161-4).

(User-Side Unit 200)

The user access content selecting unit 210 includes a man-machine interface and a communication interface which realize a series of procedures for the user to receive content delivery services via a communication line, including service subscriber application, authentication condition acquisition, login, authentication information acquisition, content list display request, content list display and browsing, content selection, credit information acquisition, and purchase acknowledgment. For example, the user access content selecting unit 210 is a unit which enables a link with services via a communication line, such as a personal computer, a set-top box, an audio-visual unit, or a household appliance. The contents of the processes have explained in the user management control unit 110 shown in FIGS. 3A and 3B, FIGS. 4A and 4B, so the explanation of them will be omitted.

Figure 9A:
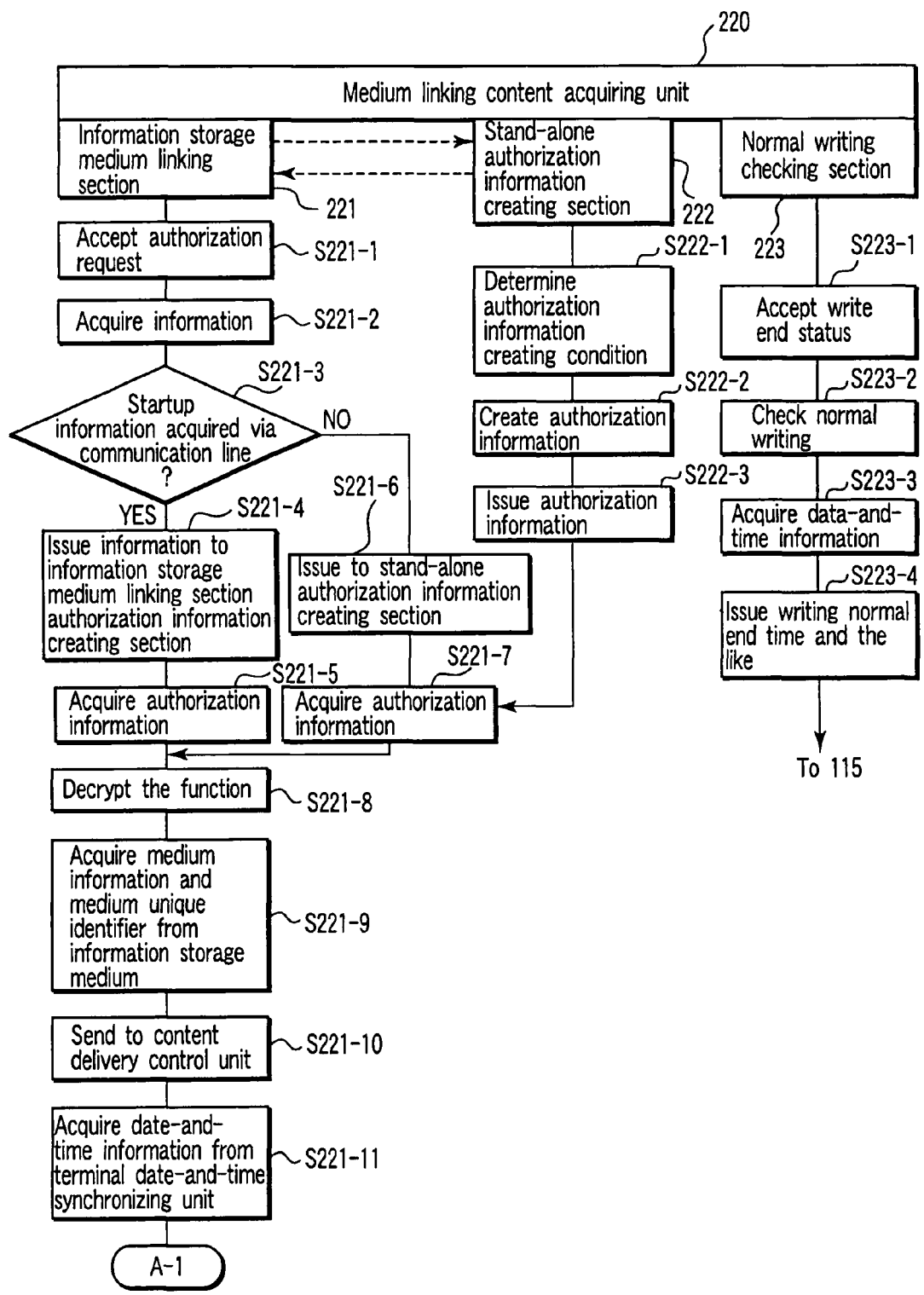
FIGS. 9A and 9B are flowcharts to help explain the processes of a medium linking content acquiring unit of the embodiment.
Figure 9B:
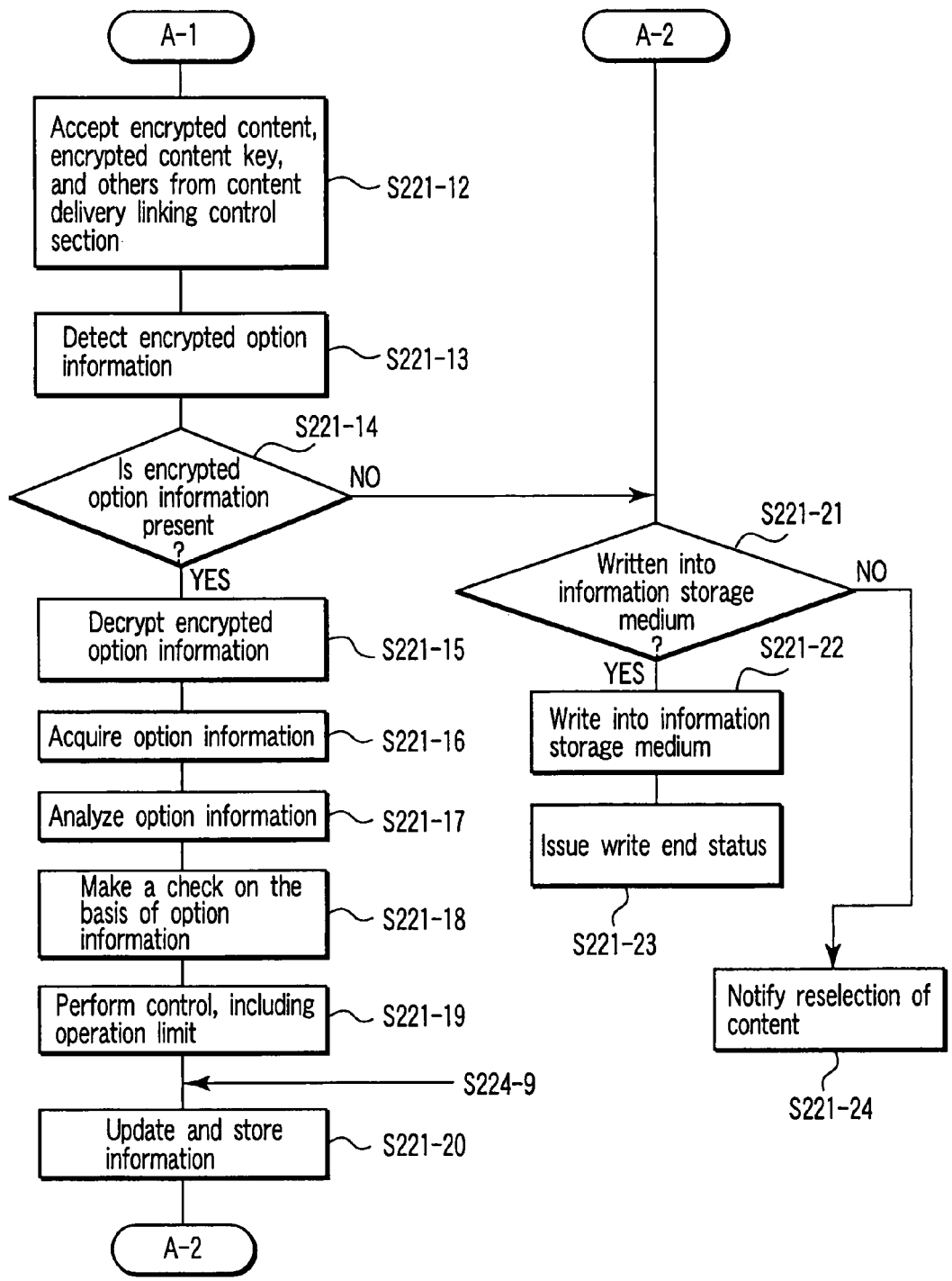
Figure 10:
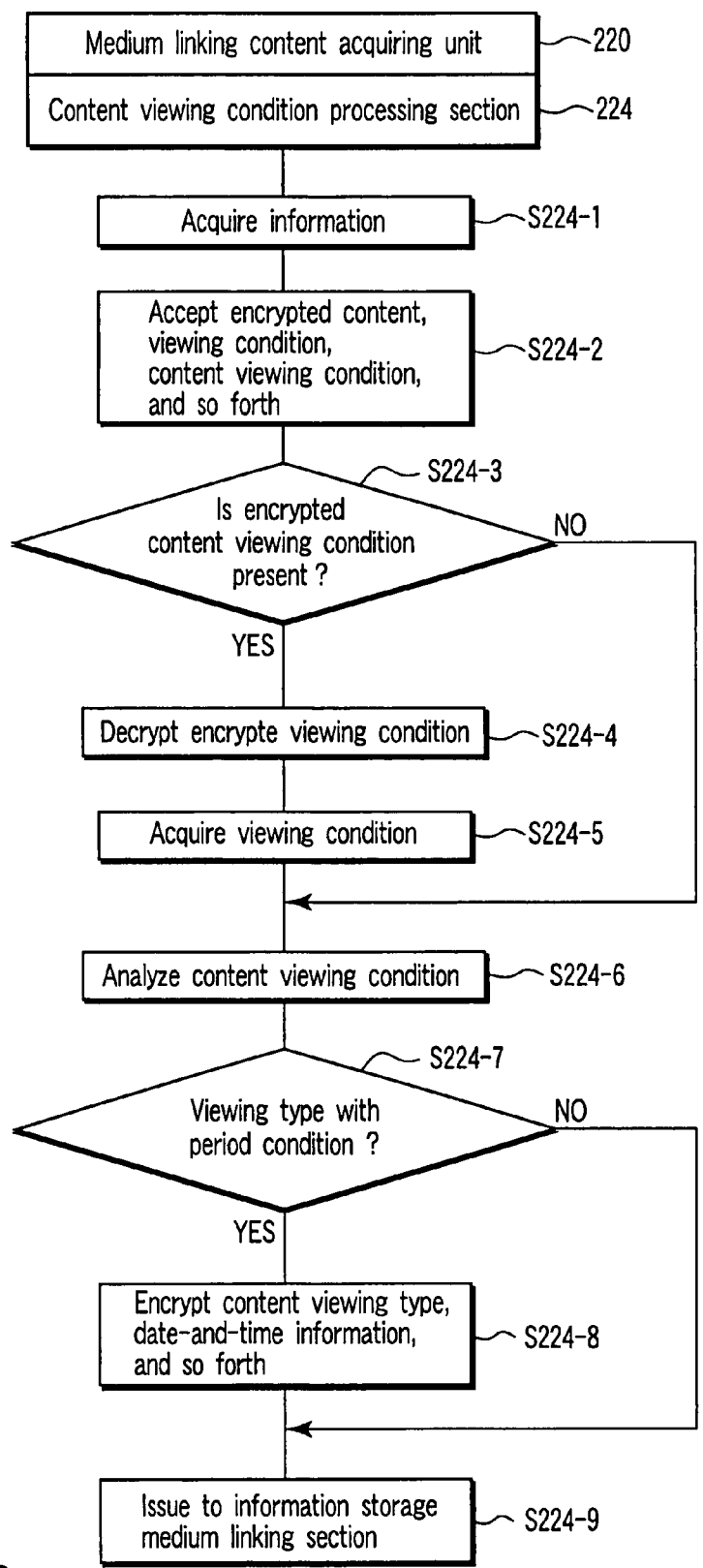
FIG. 10 is a flowchart to help explain the processes of the medium linking content acquiring unit of the embodiment.

The medium linking content acquiring unit 220 is composed of the information storage medium linking section 21, a stand-alone authorization information creating section 222, a normal writing checking section 223, and a content viewing condition processing section 224. The medium linking content acquiring unit 220 is mounted on or connected to the user-side unit 200. The contents of the processes of the blocks 221 to 224 are shown in FIGS. 9A and 9B and FIG. 10.

The information storage medium linking section 221 accepts an authorization request from the user access content selecting unit 210, content delivery control unit 140, or the user (S221-1) and, according to the authorization request, acquires the authentication information created at the user management control unit 110 at the time of login, the identifier to identify the user stored in the storage medium 270 mounted on or connected to the user-side unit 200 or the user access content selecting unit 210, the identifier to identify the user-side unit 200, and so forth (S221-2). Then, the information storage medium linking section 221 determines whether to get the authorization information via the communication line 300 (S221-3). If it gets the information via the communication line 300, the information storage medium linking section 221 issues the acquired medium information to the information storage medium linking section authorization information creating section 141 of the content delivery control unit 140 (S221-4) and acquires the authorization information from the authorization information creating section 141 (S221-5).

In the stand-alone state where the communication line is not used, the information storage medium linking section 221 issues to the stand-alone authorization information creating section 222 the authentication information created at the user management control unit 110 at the time of login, the identifier to identify the user stored in the storage medium 270 mounted on or connected to the user-side unit 200 or in the user access content selecting unit 210, the identifier to identify the user-side unit 200, and so forth (S221-6). The stand-alone authorization information creating section 222 determines the authorization information condition (S222-1). If the situation meets the condition, the stand-alone authorization information creating section 222 creates authorization information (S222-2) and issues the information to the information storage medium linking section 221 (S222-3). Then, the information storage medium linking section 221 acquires the authorization information from the stand-alone authorization information creating section 222 (S221-7).

Then, the information storage medium linking section 221 decrypts the encrypted linking application using the authorization information, starts the process (S221-8), acquires the medium information in the information storage medium 230 (the medium key information and medium unique identifier written in the read-only area of the information storage medium) to acquire the encrypted content, the encrypted content key, and the like (S221-9), and issues the information to the content delivery control unit 140 (S221-10). Furthermore, the information storage medium linking section 221 gets the date and time information from the terminal date-and-time synchronizing unit 250 (S221-11) and accepts the encrypted content, the encrypted content key, and others sent from the content delivery linking control section 141 via the communication line 300 in cooperation with the content delivery linking control section 141 (S221-12).

When accepting encrypted option information F4 from the content delivery linking control section 142, the information storage medium linking section 221 decrypts it using the authorization information (S221-13, S221-14, S221-15), thereby acquiring option information (S221-16). Then, the information storage medium linking section 221 analyzes the information to identify the content delivery unit 140, information to identify the medium linking content acquiring unit 220, information to identify a region, information to identify a user, information to show the content viewing condition, content control incidental information (e.g., menu information, transition information within the content (e.g., thumbnail and menu link), external link information (e.g., connection addresses for the Internet), and guidance information (e.g., characters and still pictures)) (S221-17). On the basis of the information, the information storage medium linking section 221 makes a check (e.g., if the viewing period is met, when the viewing period is written in the content viewing condition, or if the specified region is satisfied, the condition includes information to identify a region) (S221-18). In a manner conforming to this, the information storage medium linking section 221 performs control (such as control of the operation) (S221-19) or updates or holds the secure storage medium 270 mounted on or connected to the user-side unit 200 (S221-20). In addition, the information storage medium linking section 221 writes the specified information as option information into the writable area of the information storage medium 230 in which the encrypted content and the encrypted content key are written as needed (S221-2, S221-22). When the information storage medium linking section 221 cannot get option information in step S221-4, it skips the processes which would be carried out if the option information were present.

Then, the information storage medium linking section 221 determines whether to write the acquired encrypted content and encrypted content key into the information storage medium 230 (S221-21). When receiving a write instruction, the information storage medium linking section 221 writes the encrypted content and the encrypted content key into the writable area of the information storage medium 230 (S221-22). After the writing, the information storage medium linking section 221 issues a write end status and informs the normal writing checking section 223 of the end of the writing (S221-23). If not receiving a write instruction in step S221-21, the information storage medium linking section 221 gives notice of the reselection of the content (S221-24).

The normal writing checking section 223 accepts the write end status from the information storage medium linking section 221 (S223-1) and checks whether all of the encrypted content, the encrypted content key, and the like have been written into the writable area of the information storage medium 230 via the communication line 300 by size checking, verification, actual data comparison, and so forth (S223-2). After the checking, the normal writing checking section 223 acquires the date-and-time information from the terminal date-and-time synchronizing unit 250 (S223-3) and issues it as write normal end time to the charging and settlement section 115 (S223-4). Receiving this, the charging and settlement section 115 stores the write normal end time in the corresponding location of the charging and settlement information accumulating section F3.

The content viewing condition processing section 224 acquires the user information and others from the information storage medium linking section 221 (S224-1). On the basis of this information, the content viewing condition control section 143 accepts the encrypted content viewing condition or content viewing condition or the like acquired by the content viewing condition control section 143 from the user information accumulating section F1 and content delivery linking control section 142 in which information about the contents selected by the user (information about the state, such as the write normal end time, information about the viewing period, and the like) have been accumulated (S224-2, S224-3, S224-4, S224-5). The content viewing condition processing section 224 then analyzes the accepted information (S224-6).

When the content viewing condition is of a content viewing type with a limited period, that is, of a conditional viewing type that permits the content to be viewed only in a specific period, the content viewing condition processing section 224 encrypts information about the content viewing type, the date-and-time information, and the like (S224-7, S224-8), and issues the result to the information storage medium linking section 221 (S224-9). The information storage medium linking section 221 accepts this and stores it into the storage medium 270 (S22-20) and writes it into the writable area of the information storage medium 230 in which the encrypted content and the encrypted content key are written (S221-21, S221-22).

For example, a DVD-RAM disk is used as the information recording medium 230. In the disk, the medium key information and the medium unique identifier have been written into the read-only area. In cooperation with the medium linking content acquiring unit 220, the information storage medium linking section 2221 writes the encrypted content, encrypted content key, option information, and encrypted content viewing condition into the writable area as needed.

The content presentation control unit 240 is composed of a content presenting section 241 and a device unique key storage section 242. The contents of the processes of the content presenting section 241 are shown in FIGS. 11A and 11B.

In FIGS. 11A and 11B, the content presenting section 241 accepts a viewing request from the user or another unit or function (S241-1) and reads not only the medium information written in the read-only area of the information storage medium 230 and the encrypted content key written in the writable area but also the option information and viewing condition written in the information storage medium 230 or storage medium 270 and the device unique key held in the device unique key storage section 242 (S241-2, S241-3).

In the process of checking the option information (S241-4, S241-5), if the information storage medium 230 or storage medium 270 has the option information, the content presenting section 241 gets and analyzes the option information and issues a presentation condition based on the result of the analysis (S241-6, S241-7, S241-8). If they have no option information, the content presenting section 241 skips steps 241-6, 241-7, and 241-8.

Then, in the process of checking whether there is a viewing condition (S241-9, S241-10), if there is a viewing condition, the content presenting section 241 determines whether the viewing condition has been encrypted (S241-11). If it has not been encrypted, the content presenting section 241 acquires the condition directly. If it has been encrypted, the content presenting section 241 acquires not only the encrypted viewing condition but also the option information (S241-13, S241-14) and decrypts the viewing condition on the basis of the key information included in the option information (S241-15). When obtaining the viewing condition this way, the content presenting section 241 analyzes the viewing condition (S241-16) and, on the basis of the result of the analysis, makes a date-and-time information issuing request to the terminal date-and-time synchronizing unit 250, and acquires the date-and-time information issued from the synchronizing unit 250 in response to the request. When there is no viewing condition, the content presenting section 241 passes control to step S241-23.

Next, the content presenting section 241 checks the time limit (S241-19, S241-20). If the time limit has been expired, the content presenting section 241 issues a time-limit expiration message, verifies whether the content should be disabled (S241-21), and prevents the information written in the information storage medium 230 from being used (S241-22). If the time limit has not been expired, the content presenting section 241 creates a content key on the basis of the medium information, encrypted content key, and device unique key (S241-23) and, on the basis of the content key, decrypts the encrypted content (S241-24), and issues it in presentable form (S241-25).

Figure 12:
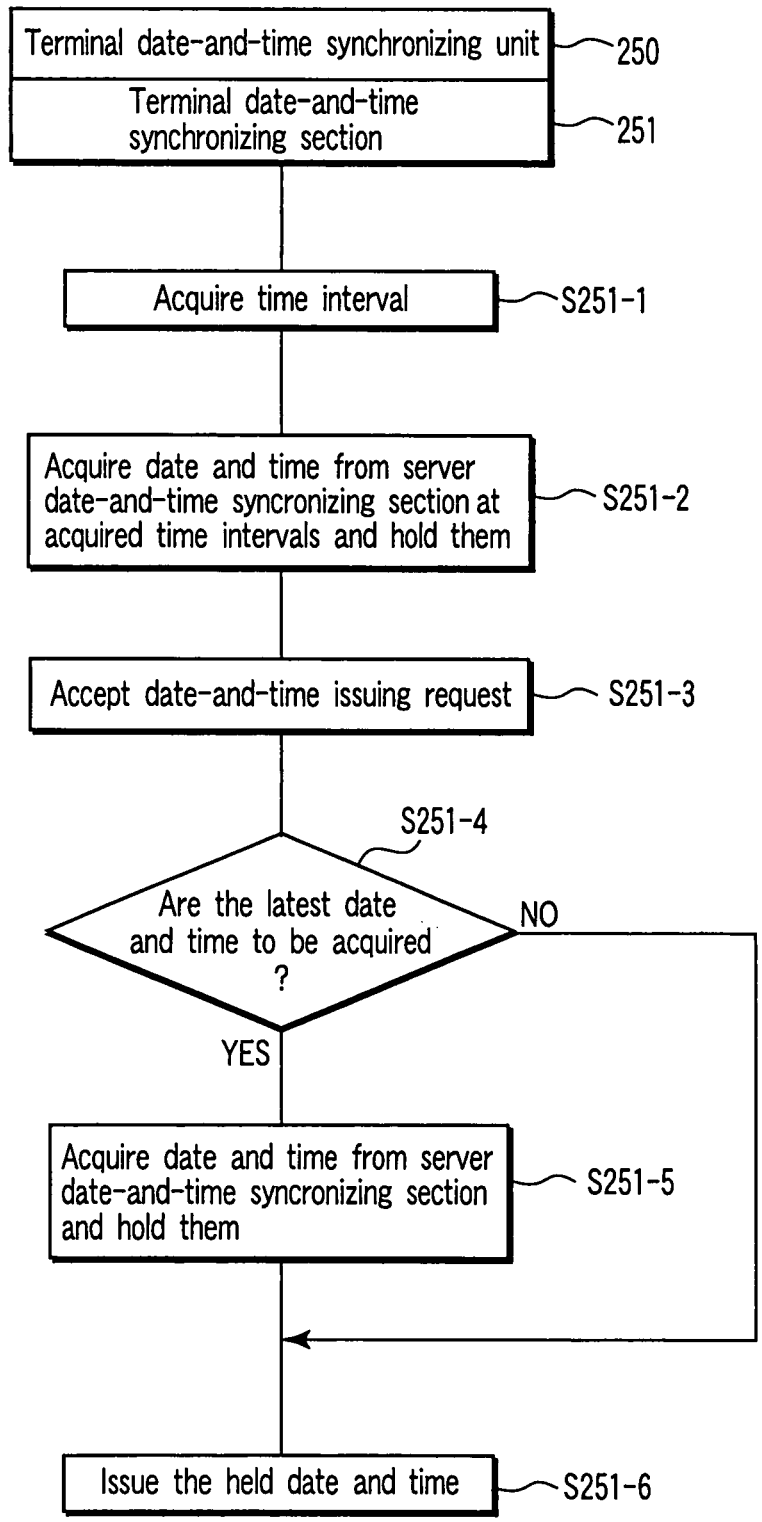
FIG. 12 is a flowchart to help explain the processes of a terminal date-and-time synchronizing unit of the embodiment.

The terminal date-and-time synchronizing unit 250 includes a terminal data-and-time synchronizing section 251. As shown in FIG. 12, the terminal data-and-time synchronizing section 251 acquires a preset time interval (S251-1), acquires date-and-time information from a server data-and-time synchronizing section 161 at the acquired time intervals via the communication line and stores it (S251-2). When receiving a date-and-time issuing request from the medium linking content acquiring unit 220, content presentation control unit 240, and the like, the terminal data-and-time synchronizing section 251 accepts this (S251-3). If having to getting the latest date and time, the terminal data-and-time synchronizing section 251 acquires the date-and-time information from the server date-and-time synchronizing section 161 and holds it (S251-4, S251-5), and issues the stored date and time (S251-6).

The terminal data-and-time synchronizing unit 250, which is mounted on the user-side unit 200, has a date-and-time holding system that cannot be set from the outside differently from a time that can be set.

Figure 13:
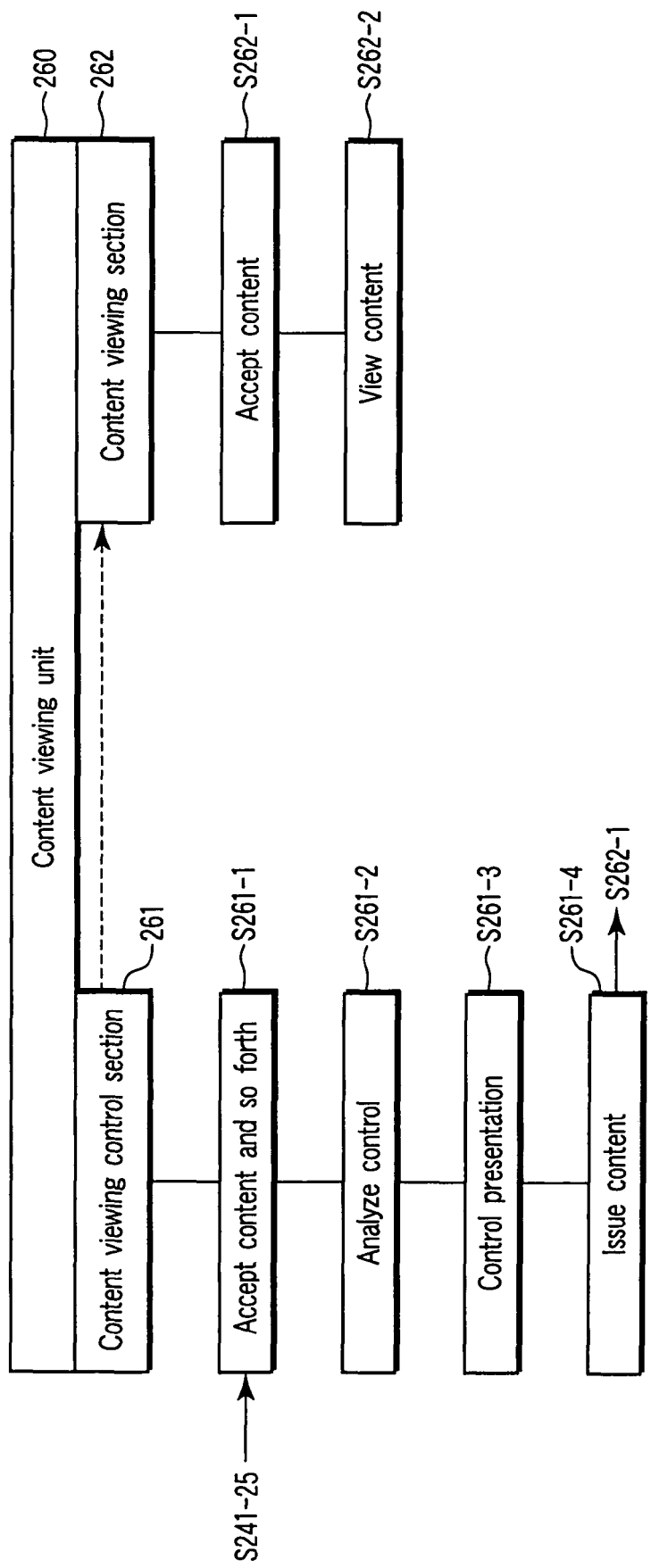
FIG. 13 is a flowchart to help explain the processes of a content viewing unit of the embodiment.

The content viewing unit 260 is a known display, such as television, which enables the user to view content. The content viewing unit 260 includes a content viewing control section 261 and a content viewing section 262. The content viewing control section 261 and content viewing section 262 carry out the processes shown in FIG. 13. The content viewing control section 261 accepts the content and others made presentable at the content presenting section 241 (S261-1), and makes an analysis and perform control to enable viewing (S261-2, S261-3), and issues the result to the content viewing section 262 (S261-4). Receiving this, the content viewing section 262 causes the resulting content to be viewed in images and sound (S262-1, S262-2).

With the content delivery system configured as described above, the following effects are obtained.

(1) The content and the content key creating condition are acquired from the copyright owner or copyright manager of the content, the copyright-protected encrypted content and content key are created, and they are made issuable. Therefore, the content can be encrypted according to the request of the copyright owner or copyright manager.

(2) When the user receives copyright-protected content delivery services via a communication line, the necessary subscriber application procedure is offered so as to comply with a form that allows the user to receive the copyright-protected content delivery services. This simplifies the procedure for the user applying for subscription and enables the user to receive delivery services according to the user's usage environment.

(3) It is determined whether the user can receive copyright-protected content delivery services. At this time, if the payment method is credit card payment, the necessary information is transmitted to the clearing corporation and the clearing identifier is received from the clearing corporation. To avoid the risk of credit card information leaks, the unnecessary information is erased. From this point on, a determination is made using the clearing identifier. Therefore, it is possible to realize safe electronic settlement, excluding ineligible users.

(4) The authentication condition is issued to the registered users beforehand. When the users log in to the copyright-protected content delivery services via a communication line, they present the authentication condition and then receive the copyright-protected content delivery services. Therefore, only the eligible users can log in and ineligible users are prevented from receiving the services.

(5) When the user logs in to a copyright-protected content delivery service according to the issued authentication condition, it is determined what services the user can receive and then the authentication information is issued. Therefore, the contents of services can be managed on a user basis, which enables suitable, thoughtful services.

(6) The content list format corresponding to the user or user-side unit is selected on the basis of the issued authentication information, brought into a form that allows various types of display, and then issued. Therefore, the content selecting operation of each user can be simplified.

(7) The user's content selection is accepted on the basis of the issued content list, a check is made with the clearing corporation on the basis of the clearing identifier and the user is informed of whether the selected content can be purchased. Therefore, illegal purchase due to the user's mistake can be avoided.

(8) A plurality of encrypted contents are accumulated, the content information selected by the user and the user information are accepted, and the encrypted content, encrypted content key, and the like are delivered via the communication line in cooperation with the user-side information storage medium via the communication line. Therefore, it is possible to deliver the encrypted content, encrypted content key, and so forth to only the eligible users.

(9) The medium information in the information storage medium (the medium key information and medium unique identifier written in the read-only area of the information storage medium) is sent via the communication line, the encrypted content, encrypted content key, and so fourth sent via the communication line are written into the writable area of the information storage medium in which the medium information has been written or into another storage medium, and the content is encrypted on the basis of the medium information. Therefore, decryption is impossible without the device information. As a result, even if the encrypted content and the encrypted content key are copied, neither the creation of the content key nor the decryption of the encrypted content can be performed with a user-side terminal unit with no medium information or with different medium information. Therefore, it is possible to limit the viewing of illegally copied content.

(10) When the function of realizing copyright-protected content delivery services installed in the user-side unit is encrypted, various pieces of information are acquired via the communication line, and authorization information is created and issued. Alternatively, in the stand-alone state where no communication line is used, authorization information is created independently. Then, startup is made according to the authorization information. Therefore, a unit other than the registered units is prevented from receiving the services, which eliminates abuse.

(11) When content is delivered by copyright-protected content deliver services, the most appropriate one (because of the lowest load or the like) of the communication lines allowing delivery is selected, information about an estimated time until the delivery of the content is made issuable, and the content delivery is started. Therefore, the load on the user side is alleviated, which improves the usability.

(12) The option information, including information to show the content viewing condition, and content control incidental information (e.g., menu information, transition information within the content (e.g., thumbnail and menu link)), external link information (e.g., connection addresses for the Internet), and guidance information (e.g., characters and still pictures), is related to the encrypted content and the encrypted content key. The resulting information is encrypted as needed and is issued as encrypted option information via the communication line. Therefore, it is possible to provide content delivery services more suitable for the user, while improving the problem of information leaks on the network.

(13) The designation of reserved delivery, such as by what time the content delivery is required to finish is made issuable, a plurality of candidates are selected, and the content is delivered in the order of time closer to the present time or in the order of specified priority. Therefore, restrictions on the user's utilization time are removed, which enables efficient delivery.

(14) The content viewing condition (including information representing that the content has a limited viewing period, allowed viewing date-and-time (period) information, information about limits to writing into an information storage medium, content protect information, age limit information, barrier-free environment information (including sign language type and identification information) are accepted, encrypted as needed, and issued. Therefore, it is possible to set suitable viewing limits according to the user's request or usage restriction.

(15) The accurate date and time are acquired from a known date-and-time issuing unit or the like via the communication line and the held date and time are issued to the requester according to the request. The timer mounted in the user-side unit uses a date-and-time holding system that cannot be set from the outside. Alternatively, even when the timer can be set, the date and time of the server are externally updated to the latest date and time in synchronization with the server side. This prevents illegal use, such as lifting time limits by shifting the date and time on the user side.

(16) A check is made if the encrypted content, the encrypted content key, and others delivered via the communication line have been written properly into the writable area of the information storage medium, the date-and-time information is acquired from the timer in item (15), and those pieces of information are issued to the copyright-protected content delivery service provider side. Therefore, the final result of the information delivered on the delivery service provider side can be checked and the suitable charging process can be carried out.

(17) When the encrypted option information in item (14) is received, it is encrypted using the authorization information in item (10) to get the option information. Then, various pieces of identification information, information about the content viewing condition, content control incidental information (e.g., menu information, transition information within the content (e.g., thumbnail and menu link)), external link information (e.g., connection addresses for the Internet), and guidance information (e.g., characters and still pictures) are analyzed. A check is made on the basis of the resulting information. On the basis of the result of the check, the limit of operation is controlled and the storage information is updated or stored. In addition, the option-specified information is written into the writable area of the information storage medium as needed. Therefore, the option specifying process can be carried out easily and safely.

(18) When data is written into the information storage medium, if the content viewing condition is of the limited-period content viewing type, that is, of the conditional viewing type permitting contents to be viewed only in a specific period, information representing the content viewing type and date-and-time information are encrypted. The encrypted information is stored into the storage medium of the user-side unit or written into the writable area of the information storage medium into which the encrypted content and the encrypted content key are written. Therefore, when the condition is not met, the viewing of the content can be prevented, which improves the copyright protection more.

The content key corresponding to the encrypted content key is selected in accordance with the contest ID information and is then issued. Hence, any other content, if available, cannot be viewed at all.

(20) The encrypted content key is created from the information in the information storage medium (the medium key information and medium unique identifier written into the read-only area of the information storage medium). In addition, the encrypted content key is also created in such a manner that it includes various pieces of identification information, information about the content viewing condition, content control incidental information (e.g., menu information, transition information within the content (e.g., thumbnail and menu link)), external link information (e.g., connection addresses for the Internet), and guidance information (e.g., characters and still pictures). Therefore, it is possible to prevent the content from being written into another information recording medium or from being viewed with another unit.

(21) A viewing request from the user or the like is accepted. Then, the information in the information storage medium is read and a content key is created on the basis of the device unique key information held in the user-side unit, medium information in the information storage medium (the medium key information and medium unique identifier written in the read-only area of the information storage medium), and the encrypted content key written in the writable area of the information storage medium. On the basis of the content key, the encrypted content is decrypted so as to be presentable. Therefore, even if the content is copied illegally onto another medium, the content key cannot be created, nor can the content be decrypted, which prevents the content from being viewed.

(22) When the storage medium of the user-side unit or the information storage medium has option information, the information is read and a presentation process is carried out on the basis of the information. Therefore, both the service provider and the user can enjoy a variety of services by selecting arbitrary options.

(23) When the storage medium of the user-side unit or the information storage medium has a viewing condition, the condition is read, the date-and-time information is acquired from the timer in item (15), a check is made if the accumulated content has expired. If the accumulated content has been expired, the user is informed of the expiration and the content is made unusable. Therefore, it is possible to deal with, for example, a case where management by time limit is needed as in renting content.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A content delivery service providing apparatus that provides a content delivery service via a communication line to a user-side terminal unit capable of recording content into one or more information storage mediums, at least one of the information storage mediums containing at least a medium unique identifier and medium information on medium key information, the content delivery service providing apparatus comprising:

a storage unit storing a set of instructions, the set of instructions comprising:

user eligibility determining instructions configured to determine whether a user who applies to subscribe to the content delivery service provided by the content delivery service providing apparatus is eligible or not based on user information supplied from the user-side terminal unit, the user information including user personal information and service coverage of the user;

user information manager instructions configured to manage user information on an eligible user determined by the user eligibility determining instructions;

authentication issuing instructions configured to issue, to the user-side terminal unit of the eligible user, login authentication to log into the content delivery service providing apparatus when it is determined that the user is eligible to subscribe to the content;

encrypted content control instructions configured to acquire the content and a content key creation condition from a copyright owner or copyright manager of the content who provides the content delivery service, and create a content key on the basis of the content key creation condition and encrypted content on the basis of the content key;

list offering instructions configured to generate a list of contents deliverable to the user-side terminal unit of the eligible user logging into the content delivery service providing apparatus using the login authentication in accordance with the service coverage of the eligible user, and to offer the list to the user-side terminal unit;

delivery instructor instructions configured to receive a user's content request comprising selection information from the user-side terminal unit to select a content from the list;

encrypted content key control instructions, separate from the encrypted content control instructions, configured to (i) accumulate content keys created by the encrypted content control instructions, (ii) register all of or a part of the medium information on medium key information, (iii) use the medium information on medium key information or the medium information on medium key information and terminal device unique key information included in the user's content request to encrypt a content key corresponding to the selected content, and (iv) issue the encrypted content key to the user-side terminal unit of the requesting user; and content delivery control instructions configured to retrieve the selected content from the encrypted contents created by the encrypted content control instructions and deliver the selected content to the user-side terminal unit of the requesting user.

2. The content delivery service providing apparatus of claim 1, the instructions further comprising:
   charging and settlement instructions configured to manage charging and settlement information on the eligible user when the selected content information is delivered.

3. A non-transitory computer-readable medium storing instructions for causing a processor to execute a method in a content delivery service providing apparatus that provides a content delivery service via a communication line to a user-side terminal unit capable of recording content into one or more information storage mediums, at least one of the information storage mediums containing at least a medium unique identifier and medium information on medium key information, the method comprising:
   determining whether a user who applies to subscribe to the content delivery service provided by the content delivery service providing apparatus is eligible or not based on user information supplied from the user-side terminal unit, the user information including user personal information and service coverage of the user;
   managing the user information on an eligible user determined by the user eligibility determining step;
   issuing, to the user-side terminal unit of the eligible user, login authentication to log into the content delivery service providing apparatus when it is determined that the user is eligible to subscribe to the content;
   acquiring the content and a content key creation condition from a copyright owner or copyright manager of the content who provides the content delivery service;
   creating a content key on the basis of the content key creation condition and encrypted content on the basis of the content key;
   generating a list of contents deliverable to the user-side terminal unit of the eligible user logging into the content delivery service providing apparatus using the login authentication in accordance with the service coverage of the eligible user;
   offering the list to the user-side terminal unit;
   receiving a user's content request comprising selecting information from the user-side terminal unit to select a content from the list;
   accumulating content keys created by the encrypted content control instructions;
   registering all of or a part of the medium information on medium key information;
   using the medium information on medium key information or the medium information on medium key information and terminal device unique key information included in the user's content request to encrypt a content key corresponding to the selected content;
   issuing the encrypted content key to the user-side terminal unit of the requesting user;
   retrieving the selected content from the encrypted contents created by the encrypted content control instructions; and
   delivering the selected content to the user-side terminal unit of the requesting user.

4. The computer-readable medium according to claim 3, the method further comprising:
   managing charging and settlement information on the eligible user when the selected content information is delivered.

* * * * *